(12) United States Patent
Chen et al.

(10) Patent No.: US 12,101,052 B2
(45) Date of Patent: Sep. 24, 2024

(54) ELECTRIC VEHICLE CONTROL SYSTEM, CONTROL METHOD, AND COMPUTER-READABLE STORAGE MEDIUM

(71) Applicant: CONTEMPORARY AMPEREX TECHNOLOGY CO., LIMITED, Ningde (CN)

(72) Inventors: Xinwei Chen, Ningde (CN); Yuanmiao Zhao, Ningde (CN); Da Xie, Ningde (CN); Yiqi Liang, Ningde (CN); Yizhen Hou, Ningde (CN); Zhimin Dan, Ningde (CN)

(73) Assignee: CONTEMPORARY AMPEREX TECHNOLOGY CO., LIMITED, Ningde (CN)

(*) Notice: Subject to any disclaimer, the term of this patent is extended or adjusted under 35 U.S.C. 154(b) by 33 days.

(21) Appl. No.: 17/880,690

(22) Filed: Aug. 4, 2022

(65) Prior Publication Data

US 2023/0208327 A1    Jun. 29, 2023

Related U.S. Application Data

(63) Continuation of application No. PCT/CN2021/142185, filed on Dec. 28, 2021.

(51) Int. Cl.
*H02P 6/21* (2016.01)
*B60L 50/60* (2019.01)
(Continued)

(52) U.S. Cl.
CPC ............ *H02P 6/21* (2016.02); *B60L 50/60* (2019.02); *H02P 1/029* (2013.01); *H02P 21/22* (2016.02)

(58) Field of Classification Search
CPC .......... B60L 50/51; B60L 50/60; B60L 3/003; H02P 21/22; H02P 1/029; H02P 3/21
See application file for complete search history.

(56) References Cited

U.S. PATENT DOCUMENTS

| | | | | |
|---|---|---|---|---|
| 9,457,792 | B2* | 10/2016 | Bradley | B60K 6/547 |
| 10,112,603 | B2* | 10/2018 | Colavincenzo | H02P 9/48 |
| 11,807,112 | B2* | 11/2023 | Colavincenzo | B60K 25/02 |

FOREIGN PATENT DOCUMENTS

| | | |
|---|---|---|
| CN | 110303905 A | 10/2019 |
| CN | 110525232 A | 12/2019 |

(Continued)

OTHER PUBLICATIONS

Extended European Search Report issued Mar. 24, 2023 in European Patent Application No. 21918100.5, 11 pages.

(Continued)

*Primary Examiner* — Thai T Dinh
(74) *Attorney, Agent, or Firm* — XSENSUS LLP

(57) ABSTRACT

An electric vehicle control system and a control method, an electric vehicle power-on method, an electric vehicle power-off method, and an electric vehicle charging method are disclosed in this application. The control system includes a domain control unit controlling an electric vehicle, a current sampling unit sampling the current of a power battery and a motor of the electric vehicle and sending sampling signals to the domain control unit, and electrical device, driven by the power battery, sampling the current flowing through it and sending the sampling signals to the domain control unit. The domain control unit, according to the sampling signals sent by the electrical device and the current sampling unit, manages the power battery and controls a motor driver module and the electrical device. The structure of the control (Continued)

system and the control policy are simplified and the power-on and power-off time is shortened.

9 Claims, 11 Drawing Sheets

(51) Int. Cl.
*H02P 1/02* (2006.01)
*H02P 21/22* (2016.01)

(56) References Cited

FOREIGN PATENT DOCUMENTS

| | | | | | |
|---|---|---|---|---|---|
| CN | 110667436 A | * | 1/2020 | .............. | B60L 58/10 |
| CN | 112193182 A | * | 1/2021 | | |
| CN | 112339574 A | * | 2/2021 | .............. | B60L 15/20 |
| JP | 2018-207584 A | | 12/2018 | | |

OTHER PUBLICATIONS

International Search Report issued Jul. 6, 2022 in International Patent Application No. PCT/CN2021/142185 with English translation.

* cited by examiner

ELECTRIC VEHICLE CONTROL SYSTEM, CONTROL METHOD, AND COMPUTER-READABLE STORAGE MEDIUM

CROSS-REFERENCE TO RELATED APPLICATION

The present application is a continuation of International Application No. PCT/CN2021/142185, filed Dec. 28, 2021, the entire contents of which is incorporated herein by reference in its entirety.

TECHNICAL FIELD

This application relates to the field of electric vehicles, and in particular, to an electric vehicle control system and a control method, an electric vehicle power-on method, an electric vehicle power-off method, and an electric vehicle charging method.

BACKGROUND

Electric vehicles, with such advantages as good environmental protection performance, low noise, low use-cost, have great market prospect and are capable of promoting energy conservation and emission reduction and facilitating the development and progress of society.

In the prior art, control components of a high-voltage electrical system of the electric vehicle mainly consist of a vehicle control unit (Vehicle Control Unit, VCU) and a battery management system (Battery Management System, BMS). The VCU, through a power distribution unit (Power Distribution Unit, PDU), performs high-voltage control of such electric components as a water cooling unit, an electric defroster, an electric air conditioner, an electric warm-air blower, an oil pump controller (oil pump DC/AC), an air pump controller (air pump DC/AC), and a DC/DC converter; and the BMS mainly performs high-voltage control of a motor driver module (inverter) of a motor control unit (Motor Control Unit, MCU).

As mentioned above, in the prior art, as control components of the high-voltage electrical system of the electric vehicle are scattered, the information interaction between the VCU and the BMS is performed through a CAN, and complex communication protocol and control strategy need to be made. And only after mutual logical judgment, may closing and disconnecting the relay be performed. Complex wiring, a plurality of wires, and long communication cycle increase the power-on and power-off time of the vehicle, and it is prone to faults, as a result of which the vehicle fails to be powered on and start normally, and the user experience is affected.

SUMMARY

In the embodiments of this application, there is provided an electric vehicle control system and a control method, an electric vehicle power-on method, an electric vehicle power-off method, an electric vehicle charging method, and a computer-readable storage medium and an electronic device, which is capable of simplifying the control system structure and the control strategy and shortening the power-on and power-off time.

According to a first aspect, there is provided an electric vehicle control system in this application, including:
a domain control unit for controlling an electric vehicle;
a current sampling unit for sampling current of a power battery and a motor driver module of the electric vehicle, and sending sampling signals to the domain control unit; and
an electrical device, driven by its power battery, for sampling current flowing through the electrical device and sending sampling signals to the domain control unit,
the domain control unit manages the power battery and controls motor driver module and the electrical device according to the sampling signals sent by the electrical device and the current sampling unit.

In the above embodiment of this application, the electric vehicle control system is provided with a domain control unit (Domain Control Unit, DCU). Sampling signals of the power battery, the motor driver module and the electrical device are directly sent to the DCU, and the DCU manages and controls the power battery, the motor driver module and the electrical device according to the sampling signals. That is, the DCU integrates the functions of the BMS, the MCU, and the VCU, not like the prior art, in which the VCU, the BMS and the MCU, with independent management and control, perform complex communication and control strategy mutually. Therefore, the control system of the electric vehicle in this embodiment, with a simple structure, is capable of simplifying the wiring, the control strategy and the communication manner.

In some embodiments, the electric vehicle control system also includes:
a switch module for turning on or off power supply circuits of the electrical device and the motor driver module; and
a voltage sampling unit for sampling voltage of the switch module and sending the sampling signals to the domain control unit,
wherein the domain control unit performs on/off control of the switch module according to the sampling signals sent by the voltage sampling unit.

In the above embodiment of this application, sampling signals of the switch module are directly sent to the DCU, and the DCU controls the switch module according to the sampling signals so as to control the operation of the electrical device and the motor driver module. That is, the DCU further integrates the functions of the PDU. Therefore, the control system structure of the electric vehicle in this embodiment is further simplified, and the wiring, the control strategy and the communication manner are also further simplified.

In some embodiments, the domain control unit detects a state of the electrical device and calculates test data to determine a control strategy of the electrical device.

In the above embodiment of this application, the DCU receives sampling signals from the electrical device, detects its state, calculates the detected state data, and determines control strategy of the electrical device on the basis of the calculated detection data. That is, the DCU performs internal calculations and logical judgment, and the calculation results may be shared. Thus, the procedures that each controller processes and then transmits data individually in the prior art are eliminated, and the comprehensive processing capacity is greatly improved, and it is not needed to formulate complex communication protocol and control strategy.

In some embodiments, the domain control unit is connected to the electrical device and the current sampling unit with signal wires, and the domain control unit is connected to the switch module with hard wires.

In the above embodiment of this application, the DCU is connected to the electrical device and the current sampling unit through the CAN, and the communication between the DCU and the electrical device and the current sampling unit is performed through the CAN Protocol (Controller Area Network Protocol, controller area network bus protocol). The DCU receives the sampling types of the electrical device and the current sampling unit, and sends control signals to them. As the DCU and the switch module are connected with hard wires, signals may be transmitted fast between the DCU and the switch module and then the switch module may be controlled quickly.

In some embodiments, the electrical device comprises an air pump controller, an oil pump controller, an air conditioner compressor, a water cooling unit, a voltage conversion module (DC/DC), and the motor driver module.

In the above embodiment of this application, the DCU controls a plurality of electrical device such as the air pump controller, the oil pump controller, the air conditioner compressor, the water cooling unit, the voltage conversion module (DC/DC), and the motor driver module to achieve high side power distribution control of the vehicle.

According to a second aspect, there is provided an electric vehicle control method in this application. The electric vehicle is provided with the domain control unit, and the control method includes:

the domain control unit receiving sampling signals from a power battery and an electrical device, and managing and controlling operations of the power battery and the electrical device according to the sampling signals.

In the above embodiment of this application, the domain control unit directly receives sampling signals of the power battery and the electrical device, and manages and controls the operation of the power battery and electrical device directly according to the sampling signals. That is, the DCU integrates the functions of the BMS, the MCU, and the VCU, and the electric vehicle control method in this embodiment is capable of simplifying the control strategy and the communication manner, not like the prior art, in which the VCU, the BMS and the MCU, with independent management and control, perform complex communication and control strategy mutually.

In some embodiments, the domain control unit receives the sampling signals from a switch module and performs on/off control of the switch module according to the sampling signals.

In the above embodiment of this application, sampling signals of the switch module are directly sent to the DCU, and the DCU controls the switch module according to the sampling signals so as to control the operation of the electrical device and the motor driver module. That is, the DCU further integrates the functions of the PDU. Therefore, the electric vehicle control method in this embodiment further simplifies the control strategy and the communication manner.

In some embodiments, the domain control unit detects a state of the electrical device and calculates test data to determine a control strategy of the electrical device.

In the above embodiment of this application, the DCU receives sampling signals from the electrical device, detects its state, calculates the detected state data, and determines control strategy of the electrical device on the basis of the calculated detection data. That is, the DCU performs internal calculations and logical judgment, and the calculation results may be shared. As a result, the procedures that each controller processes and then transmits data individually in the prior art are eliminated. The comprehensive processing capacity is greatly improved, and it is not needed to formulate complex communication protocol and control strategy.

In some embodiments, the domain control unit is connected to the electrical device and the current sampling unit with signal wires, and the domain control unit is connected to the switch module with hard wires.

In the above embodiment of this application, the DCU is connected to the electrical device and the current sampling unit with signal wires, such as CAN connection, that is, the communication between the DCU and the electrical device and the current sampling unit is performed through the CAN Protocol (Controller Area Network Protocol, controller area network bus protocol). The DCU receives the sampling signals of the electrical device and the current sampling unit, and sends control signals to them. As the DCU and the switch module are connected with hard wires, signals may be transmitted fast between the DCU and the switch module and then the switch module may be controlled quickly.

In some embodiments, the electric devices include the air pump controller, the oil pump controller, the air conditioner compressor, the water cooling unit, the voltage conversion module, and the motor driver module.

In the above embodiment of this application, the DCU controls a plurality of electrical device such as the air pump controller, the oil pump controller, the air conditioner compressor, the water cooling unit, the voltage conversion module (DC/DC), and the motor driver module to achieve high side power distribution control of the vehicle.

According to a third aspect, there is provided an electric vehicle power-on method in this application. The electric vehicle is provided with a domain control unit for receiving sampling signals from a power battery, a switch module, and an electrical device, and manages and controls operations of the power battery, the switch module, and the electrical device according to the sampling signals, and the power-on method includes the following steps:

initializing, by the domain control unit, after detecting a power-on request sign;

detecting, by the domain control unit, whether a power-on condition is satisfied after completing the initializing;

sending, by the domain control unit, a closing command to a major loop relay K0 connected to a negative pole of the power battery when the power-on condition is satisfied, to connect to the major loopclosing command;

sending, by the domain control unit, the closing command to a precharging loop relay K4 of a motor drive module to connect to the precharging loop to precharge the motor drive module closing command;

sending, by the domain control unit, the closing command to a motor drive loop relay K3 connected to a positive pole of the motor drive module, to connect to a motor drive loopclosing command;

sending, by the domain control unit, a disconnect instruction to the relay K4 of the precharging loop to end precharging, to complete power-on of the major loop; and sending, by the domain control unit, the closing commands to a water cooling unit relay K5, an electric defroster relay K6, an air conditioning warm-air blower K7, and an auxiliary drive K8, to connect to each high-voltage electrical device, to complete power-on of the vehicle closing command.

In the power-on method described in the above embodiment of this application, the domain control unit directly controls the relay and thus the control capability is centralized and the response is fast, and the situation in the prior art that the VCU, the BMS and the PDU work independently and perform complex communication and control strategy mutually is simplified. In this embodiment, the DCU detects and calculates the power-on conditions and makes logical judgment, and the calculation results are shared, thus the link in the prior art that each controller transmits data to each other and the VCU makes judgment is eliminated. Therefore, the communication manner and the control strategy of the power-on method in this embodiment are simple and capable of shortening the power-on time.

In some embodiments, the steps of the domain control unit to detect power-on conditions include:
  detecting whether the high-voltage electrical device is turned off and is disable to output;
  detecting whether there is any fault that prevents the vehicle from powering on; and
  diagnosing contacts of each of the relays.

In the technical solutions described in the above embodiment of this application, the domain control unit quickly detects the above power-on conditions, thus the power-on time is shortened and also the power-on safety is ensured.

In some embodiments, after diagnosing each of the relays, the domain control unit reads information about the electrical device stored inside the domain control unit; and
  the domain control unit performs calculations according to the read information about the electrical device and then performs high-voltage distribution for the electrical device according to calculation results.

In the technical solutions described in the above embodiment of this application, the DCU reads the information stored in its internal electrical device and performs internal calculations, and the high-voltage distribution strategy of the electrical device is determined and energy management and power distribution are optimized according to the calculation results. The internal information and calculation results of the DCU may be shared, thus the procedures that each controller processes and then transmits data individually in the prior art are eliminated, and complex communication protocol and control strategy are not needed, and also the power-on time is greatly shortened and faults are reduced.

In some embodiments, the information about the electrical device read by the domain control unit comprises information of the electrical device to be turned on and rated power and weight of each electrical device.

In the technical solutions described in the above embodiment of this application, the DCU reads what electrical device needs to be turned on and the rated power and weight of each electrical device, and, by reference to the State of Charge (SOC) of the battery, performs calculations according to the rated power of the electrical device, and then determines whether power processing is required for the equipment with certain powers according to the calculation results in order to optimize high-voltage distribution and energy management.

According to a fourth aspect, there is provided an electric vehicle power-off method in this application. The electric vehicle is provided with a domain control unit for receiving sampling signals from a power battery, a switch module, and an electrical device, and manages and controls operations of the power battery, the switch module, and the electrical device according to the sampling signals, and the power-off method includes the following steps:
  issuing, by the domain control unit, a power-off instruction;
  detecting, by the domain control unit, whether current of a major loop connected to a negative pole of the power battery is less than a preset value;
  sending, by the domain control unit, a disconnection instruction to a motor drive loop relay K3 connected to a positive pole of a motor driver module, to disconnect the motor drive loop; and
  sending, by the domain control unit, the disconnection instruction to the major loop relay K0 connected to the negative pole of the power battery, to disconnect the major loop.

In the power-off method described in the above embodiment of this application, the domain control unit (DCU) gives a power-off instruction, followed by the power-off process, namely an active power-off mode. In the power-off method, the domain control unit directly controls the relay and thus the control capability is centralized and the response is fast, and the situation in the prior art that the VCU, the BMS and the PDU work independently and perform complex communication and control strategy between each other is simplified. Therefore, the power-off method in the embodiment, with simple communication manner and control strategy, is capable of shortening the power-off time.

According to a fifth aspect, there is provided an electric vehicle power-off method in this application. The electric vehicle is provided with a domain control unit for receiving sampling signals from a power battery, a switch module, and an electrical device, and manages and controls operations of the power battery, the switch module, and the electrical device according to the sampling signals, and the power-off method includes the following steps:
  turning off the electronic device by the domain control unit, after receiving a power-off request instruction, and disconnecting a water cooling unit relay K5, an electric defroster K6, and an air conditioning warm-air blower relay K7;
  acquiring, by the domain control unit, current of a major loop connected to a negative pole of the power battery, to determine whether the current is less than a preset value;
  acquiring, by the domain control unit, current of a motor drive loop connected to a positive electrode of a motor driver module, and lowering the current to the preset value;
  sending, by the domain control unit, a disconnection instruction to the motor drive loop relay K3 to disconnect the motor drive loop; and
  sending, by the domain control unit, the disconnection instruction to the relay K0 of the major loop connected to a negative pole of the power battery to disconnect the major loop.

In the power-off method described in the above embodiment of this application, the domain control unit (DCU) receives a power-off request instruction, followed by the power-off process, namely a passive power-off mode. In the power-off method, the DCU acquires the current acquisition signals of the power battery and the motor driver module and determines the state of the power battery and the motor driver module, and the domain control unit directly controls the relay and thus the control capability is centralized and the response is fast, and the link in the prior art that the VCU, the BMS and the PDU work independently and perform complex communication and control strategy between each other is simplified. Therefore, the power-off method in the embodiment, with simple communication manner and control strategy, is capable of shortening the power-off time.

According to a sixth aspect, there is provided an electric vehicle charging method in this application. The domain control unit receives sampling signals from the power battery, the switch module, and the electrical device, and manages and controls the operation of the power battery, switch module, and electrical device according to the sampling signals, and the charging method includes the following steps:

sending, by a charging source, a wake-up signal to the domain control unit;

initializing, by the domain control unit, after receiving the wake-up signal, and determining whether a charging connection signal is normal and a charging gun is set;

sending, by the domain control unit, a closing command to a relay connected to a negative pole of the charging source and a relay connected to a positive pole of the charging source, to start charging; and sending, by the domain control unit, the closing commands to the major loop relay K0 connected to a negative pole of the power battery and a water cooling unit relay K5, to start water cooling closing command closing command.

In some embodiments, when the domain control unit detects that the charging state reaches the ending condition, an instruction to end the charging will be sent, and the domain control unit sends disconnecting instructions to disconnect the relay K1 connected to the positive pole of the charging source, the relay K2 connected to the negative pole of the charging source, the water cooling unit relay K5, and the major loop relay K0 connected to the negative pole of the power battery so as to end the charging.

In the charging method described in the above embodiment of this application, the domain control unit directly controls the relay and thus the control capability is centralized and the response is fast, and the situation in the prior art that the VCU, the BMS and the PDU work independently and perform complex communication and control strategy between each other is simplified. Therefore, the charging method in the embodiment, with simple communication manner and control strategy, is capable of reducing faults.

According to a seventh aspect, there is provided a computer-readable storage medium stored with computer-executable instructions, which, when being executed by a processor, perform the method according to any one of the second to sixth aspects of the present application.

According to an eighth aspect, there is provided an electronic device, including: a memory stored with computer instructions; and a processor executing the computer instructions to perform the method according to any one of the second to sixth aspects of the present application.

BRIEF DESCRIPTION OF DRAWINGS

The following gives a description of the technical solutions in the embodiments of this application with reference to drawings. The following drawings are merely intended for showing preferred implementations but not limit this application. In addition, of all the drawings, the same drawing reference numeral indicates the same component.

DETAILED DESCRIPTION OF EMBODIMENTS

Figure 1:
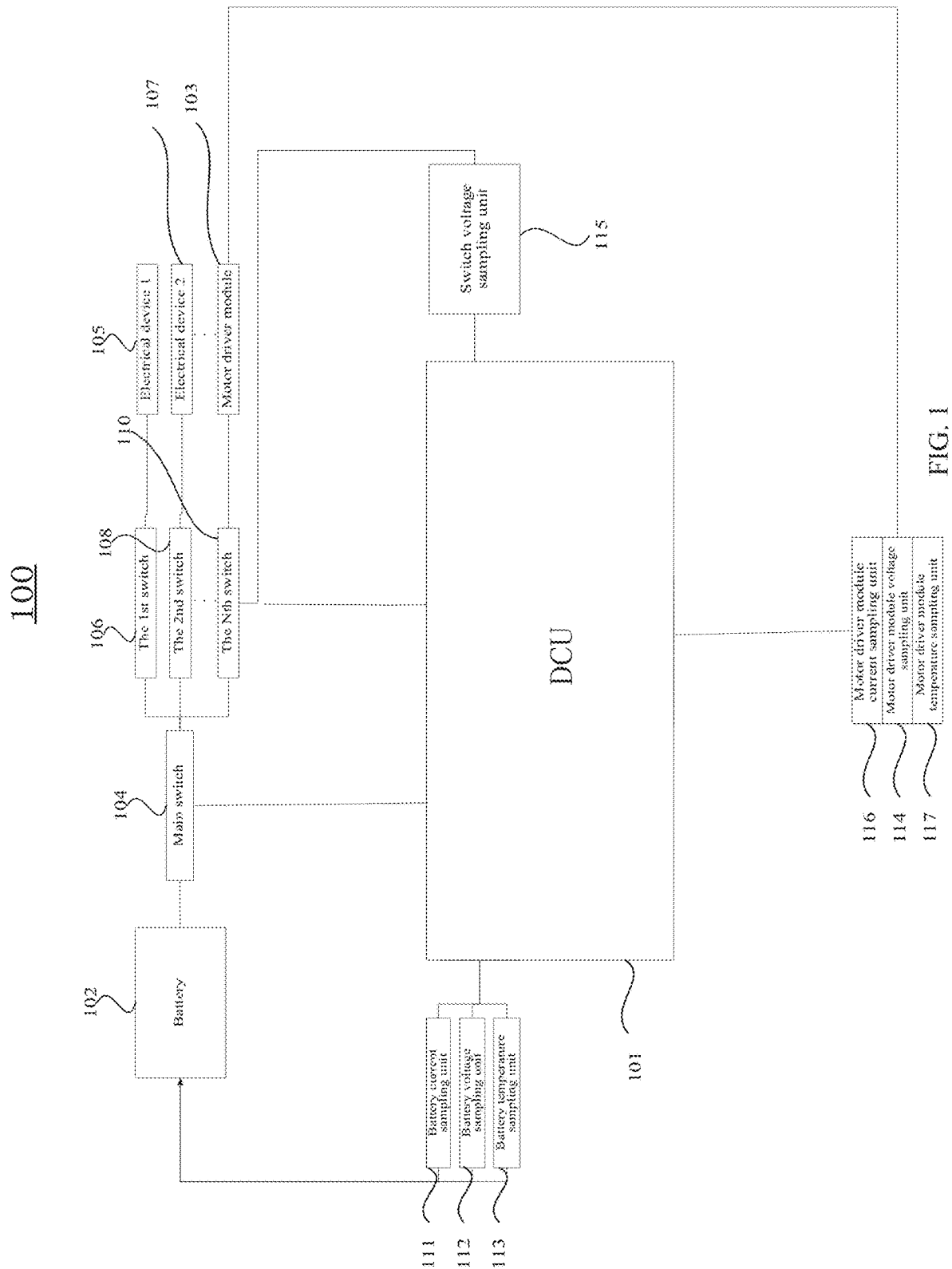
FIG. 1 is a structural schematic diagram of the electric vehicle control system according to some embodiments of this application.

The following gives a detailed description of the embodiments of the technical solutions of this application with reference to drawings. The following embodiments are merely intended for specifying the technical solutions of this application and may not be used to limit the scope of protection of this application.

Unless otherwise defined, all technical and scientific terms used herein have the same meaning as those normally understood by those skilled in this art; the terms used herein are merely for the purpose of describing specific embodiments but not limiting this application; and the terms "include" and "have" and any variations of them in the description and claims and the drawings of this application are intended to cover non-exclusive inclusions.

In the description of the embodiments of this application, technical terms such as "first" and "second" are merely intended for distinguishing different objects and may not be understood as indicating or implying relative importance, or implicitly indicating the quantity, specific order or primary and secondary relation of the indicated technical features.

All embodiments described in the description are not mutually exclusive, and those skilled in this art may have all these embodiments combined according to the technical ideas and general technical knowledge of this application.

In the description of the embodiments of this application, the term "and/or" only describes the association relation of the associated objects and means that there may be three relations. For example, A and/or B may be expressed as the three cases: A exists alone, A and B exist simultaneously, and B exists alone. In addition, the character "/" herein generally indicates that the relation between the associated objects is "or".

In the description of the embodiments of this application, the term "a plurality of" means more than two (including two), "more groups" means more than two groups (including two groups), and "more pieces" means more than two pieces (including two pieces).

In the description of the embodiments of this application, unless otherwise expressly provided and defined, the terms "mount", "concatenate", "connect", "fix", and the like shall be understood in a broad sense. For example, a "connection" may be a fixed connection, a detachable connection, or an integrated connection, may be a mechanical connection or an electric connection, may be a direct connection or an indirect connection implemented through an intermediary, and may be an internal communication between two elements or an interaction of two elements. A person of ordinary skill in the art can understand the specific meanings of the terms in the embodiments of this application according to specific situations.

The electric vehicle is powered by the power battery. The electric vehicle includes an electric drive and control system, a driving force transmission device, a traveling device, a steering device, a braking device, and other mechanical systems. The electric drive and control system, as the core of the electric vehicle, distinguishes electric vehicles from traditional oil-fueled vehicles. And the electric drive and control system includes the power battery, a motor, a motor speed control device, and the like. The electric vehicle is a complex system including a plurality of subsystems. In the prior art, each subsystem performs its functions through its own electronic control unit (Electronic Control Unit, ECU).

The electrical system of the electric vehicle includes a high-voltage electrical system and a low voltage electrical system. The high-voltage electrical system mainly controls the startup, travel, charging and discharging, air conditioning, and the like of the electric vehicle, and a power battery system, a motor drive system, a high-voltage power distribution system, a charging system, high-voltage electrical device, and the like.

The electric vehicle is equipped with a vehicle control unit (Vehicle Control Unit, VCU) to control each component and coordinate each subsystem of the electric vehicle. The VCU acquires signals from an accelerator pedal, a brake pedal and other components and then determine how to control the movement of each component controller to drive the electric vehicle to run normally. The VCU achieves optimal energy utilization and extends the service life by coordinating and managing the Motor Control Unit (MCU), the Battery Management System (BMS), the transmission system and other vehicle-mounted energy-consuming electrical device of the electric vehicle.

The Motor Control Unit (MCU) (also known as motor control module) of the electric vehicle controls the motor driver module, and the motor driver module drives the motor. The MCU converts the high-voltage direct current of the power battery into the high-voltage alternating current required to drive the electric vehicle so as to drive the motor to output mechanical energy. The MCU receives the vehicle travel control instructions of the VCU and controls the motor to output specified torque and rotating speed to drive the vehicle to run.

The battery management system (Battery Management System, BMS) of the electric vehicle power battery, a control system protecting the power battery for safe use, performs charging and discharging management, high-voltage control, battery protection, battery data acquisition, battery status assessment, energy balance between battery cells, and calculation of the state of charge (State of Charge, SOC, namely battery remaining capacity) of power batteries with the SOC maintained within a reasonable range, and dynamically monitors the working state of the power batteries, and the like.

The energy-consuming electrical device of the electric vehicle mainly includes the water cooling unit, the electric defroster, the electric air conditioner, the electric warm-air blower, the oil pump controller, the air pump controller and the DC/DC converter, and the like. The water cooling unit, through water convection heat transfer, takes away the heat generated by the battery and lowers the temperature of the battery. The electric defroster arranges a plurality of heating resistance wires evenly in a windshield, and after a resistance switch is turned on, the resistance wires heats the glass rapidly, then the temperature of the glass rises rapidly and the frost mist attached to the glass melts with heat, and the defrosting is achieved. The electric warm-air blower mainly consists of an air heater and a fan. The air heater radiates heat and the fan sends the heat out to regulate the air temperature in the car.

The oil pump controller (oil pump DC/AC), connected to the oil pump, is used to control the motor of a power steering pump of the electric vehicle. The oil pump DC/AC inverts the direct current over 300V in a battery pack of the electric vehicle into alternating current to supply power to the oil pump. By controlling the power supply current, the rotating speed and power of the oil pump are controlled.

The air pump controller (air pump DC/AC), connected to the air pump, is used to control the motor of a brake air pump of the electric vehicle. The air pump controller converts the direct current of the electric vehicle into the alternating current to supply power to the air pump, and controls the rotating speed and power of the air pump by controlling the power supply current.

The DC/DC is a voltage conversion module, which converts the high-voltage direct current of the power battery to the 12V direct current to supply power to the low-voltage system.

The PDU (Power Distribution Unit, distribution unit, distribution panel) electrically connects high-voltage elements and devices with busbars and wire harnesses to provide such functions as charging and discharging control, high-voltage component power-on control, circuit overload and short-circuit protection, high-voltage sampling, and low-voltage control for the high-voltage system of the electric vehicle to protect and monitor the operation of the high-voltage system.

In the prior art, high side control components for high-voltage power distribution in the electric vehicle mainly include the VCU (Vehicle Control Unit, vehicle controller) and the BMS (Battery Management System, power battery management system). The VCU, through the power distribution unit (Power Distribution Unit, PDU), mainly performs high-voltage control of such electrical device as the water cooling unit, the electric defroster, the electric air conditioner, the electric warm-air blower, the oil pump DC/AC, and the air pump DC/AC and DC/DC; and the BMS mainly performs high-voltage control of the motor driver module (inverter) of the motor control unit (Motor Control Unit, MCU).

The control of high side control components in the prior art is relatively scattered, resulting in complex structure and wiring of the high side control components in the prior art. Furthermore, the VCU and BMS need to perform information interaction through the CAN (Controller Area Network), and complex communication protocol and control strategy need to be made. And only after mutual logical judgment, may closing and disconnecting the relay be performed, and thus the power-on and power-ff time of the vehicle is increased due to the long power-on and power-off cycle, and it is prone to faults, as a result of which the vehicle fails to be powered on and start normally, and the user experience is affected.

In addition, in the prior art, each function of the electric vehicle generally needs to be equipped with a controller. With the continuous increase of functions of the electric vehicle, the number of controllers increases dramatically, which makes the electronic system of the electric vehicle become very complicated. This leads to an increase in the cost of the vehicle and a waste of hardware resources, which is not beneficial to the development of electric vehicles. To solve the problem of distributed electronic and electrical architecture in the prior art, a concept of the domain control unit (Domain Control Unit, DCU) is proposed recently. For example, the electronic components of the electric vehicle are divided into a plurality of domains such as a dynamic domain, an intelligent cockpit domain, and an autonomous driving domain, with each domain controlled by a controller chip with more processing power in a relatively centralized manner.

In the embodiments of this application, there is provided an electric vehicle control system and a control method, an electric vehicle power-on method, an electric vehicle power-off method, and an electric vehicle charging method, which is capable of simplifying the control system structure and the control strategy and shortening the power-on and power-off time.

FIG. 1 is a structural schematic diagram of the electric vehicle control system according to some embodiments of this application.

In the embodiments of this application, an electric vehicle control system 100 includes: a DCU 101 (domain control unit, Domain Control Unit), a battery current sampling unit 111, and a motor driver module current sampling unit 116, and the electrical device 105 and 107 and DCU 101 control the electric vehicle, and the battery current sampling unit 111 and the motor driver module current sampling unit 116 conduct current sampling on the power battery 102 and the motor driver module 103 of the electric vehicle respectively, and then send the sampling signals to the DCU 101. The electrical device 105 and 107, driven by the power battery 102, sample the current flowing through the electrical device 105 and 107 and send the sampling signals to the DCU 101. And the DCU 101, according to the sampling signals sent by the electrical device 105 and 107 and the current sampling units 111 and 116, manages and controls the power battery 102, the motor driver module 103, and the electrical device 105 and 107.

It needs to be noted that the motor driver module 103 also belongs to the electrical device. For convenience, the motor driver module 103 is described differently from other electrical device 105 and 107.

As an embodiment of this application, the electric vehicle control system 100 also includes, the main switch 104 connected to the power battery 102 with power lines, the $1^{st}$ switch 106 connected to the first electrical device 105, the $2^{nd}$ switch 108 connected to the second electrical device 107, the $N^{th}$ switch 110 connected to the motor driver module 103, and a switch voltage sampling unit 115. The $1^{st}$ switch 106, the $2^{nd}$ switch 108 and the $N^{th}$ switch 110 switch on or switch off the power supply circuit of the electrical device 105 and 107 and the motor driver module 103; the switch voltage sampling unit 115 samples the voltage of the $1^{st}$ switch 106, the $2^{nd}$ switch 108 and the $N^{th}$ switch 110 and sends the sampling signals to the DCU 101; and the DCU 101 performs on/off control of the $1^{st}$ switch 106, the $2^{nd}$ switch 108 and the $N^{th}$ switch 110 according to the sampling signals sent by the switch voltage sampling unit 115.

As shown in FIG. 1, the power battery 102 is connected to the main switch 104 with power lines, and the main switch 104 is connected to the $1^{st}$ switch 106, the $2^{nd}$ switch 108 and the $N^{th}$ switch 110 with power lines respectively.

The battery current sampling unit 111, the battery voltage sampling unit 112 and the battery temperature sampling unit 113 are connected to the DCU 101 with signal wires to acquire the current, voltage and temperature information of the power battery 102 and send the acquisition signals to the DCU 101. The DCU 101 receives the current, voltage and temperature sampling signals of the power battery 102, and performs calculations and judgment. According to the judgment results, the DCU 101 controls the current distribution of the switches 104, 106, 108, and 110, the electrical device 105 and 107, and the motor driver module 103, and the like.

The switch voltage sampling unit 115 is connected to the DCU 101 with signal wires to acquire the voltage signals of the $1^{st}$ switch 106, the $2^{nd}$ switch 108 and the Nit switch 110 and send the acquisition signals to the DCU 101. The DCU 101 receives the sampling signals of the $1^{st}$ switch 106, the $2^{nd}$ switch 108 and the Nit switch 110, performs calculations and judgment, and controls the $1^{st}$ switch 106, the $2^{nd}$ switch 108 and the $N^{th}$ switch 110 according to the judgment results.

The motor driver module current sampling unit 116, a motor driver module voltage sampling unit 114, and a motor driver module temperature sampling unit 117 are connected to the DCU 101 and the motor driver module 103 with signal wires; and the motor driver module current sampling unit 116, the motor driver module voltage sampling unit 114, and the motor driver module temperature sampling unit 117 acquire the current, voltage and temperature information of the motor driver module 103 and send the acquisition signals to the DCU 101. The DCU 101 receives the current, voltage and temperature sampling signals of the motor driver module 103, performs calculations and judgment, and controls such drive signals as the torque and rotating speed output to the motor by the motor driver module 103 according to the judgment results.

In the above embodiment of this application, the electric vehicle control system 100 includes the domain control unit DCU 101; the sampling signals of the power battery 102, the motor driver module 103, and the electrical device 105 and 107 are directly sent to the DCU 101, and the DCU 101 manages the power battery 102 and controls the motor driver module 103 and the electrical device 105 and 107 according to the sampling signals. That is, the DCU 101 integrates the functions of the VCU, the BMS and the MCU in the prior art.

In a further embodiment of this application, the sampling signals of the switches 106, 108 and 110 are directly sent to the DCU 101, and the DCU 101 controls the switches 106, 108 and 110 according to the sampling signals so as to control the electrical device 105 and 107 and the motor driver module 103. That is, the DCU 101 further integrates the functions of the PDU 605 in the prior art.

As the DCU 101 in this embodiment integrates the functions of the VCU, the BMS, the PDU and the MCU, the VCU, the BMS, the PDU and the MCU need not to conduct independent management and control or perform complex communication and control strategy mutually like in the prior art. Therefore, the electric vehicle control system 100 in this embodiment, with a simple structure, is capable of simplifying the wiring, the control strategy and the communication manner.

Figure 2:
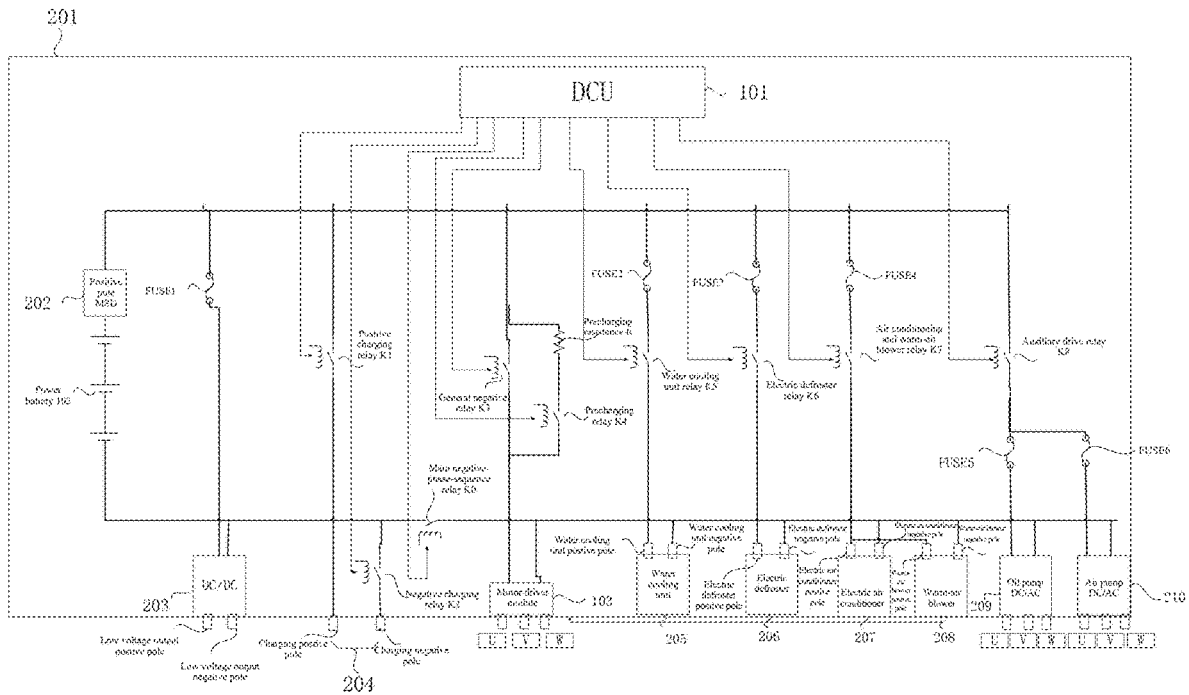
FIG. 2 is a schematic diagram of high-voltage power distribution of the electric vehicle control system according to some embodiments of this application.

FIG. 2 is a schematic diagram of high-voltage power distribution of the electric vehicle control system according to some embodiments of this application.

As shown in FIG. 2, in the electric vehicle control system 100, the DCU 101 is arranged in a high voltage distribution box 201.

In FIG. 2, the high-voltage electrical device such as a DC/DC 203, a reserved charging port 204 for connecting a charger, the motor driver module 103, a water cooling unit 205, an electric defroster 206, an electric air conditioner 207, an electric warm-air blower 208, an oil pump DC/AC 209, and an air pump DC/AC 210 are connected with the power battery 102 with power lines. On the lines between the power battery 102 and each electrical device, there are relays connected, and the relays are used as the switches to switch on or off the power supply circuit of each electrical device, and there is also a circuit protection element FUSE. Each switch is connected with the DCU 101 with hard wires, and the DCU 101 controls the disconnection and closing of each switch and the current supplied by the power battery 102 to each electrical device so as to perform high voltage distribution and drive each electrical device.

It needs to be noted that the diagram of the sampling unit is omitted in FIG. 2 for convenience of description.

Specifically, in FIG. 2, the positive pole of the power battery 102 is connected to a manual maintenance switch MSD 202, and its negative pole is connected to a general negative relay K0, and the positive and negative poles of the charging port 204 are respectively connected to a positive charging relay K1 and a negative charging relay K2. The positive ole of the motor driver module 103 is connected to a positive-side main relay K3 and the precharging relay K4, and the precharging relay K4 precharges the capacitor in the motor driver module 103. The positive pole of the water cooling unit 205 is connected to the water cooling unit relay K5: the positive pole of the electric defroster 206 is connected to the electric defroster relay K6; the positive pole of the electric air conditioner 207 and the positive pole of the electric warm-air blower 208 are connected to the relay K7; and the positive pole of the oil pump DC/AC 209 and the positive pole of the air pump DC/AC 210 are connected to the relay K8.

The relays K1, K2, K3, K4, K5, K6, K7, and K8 are connected to the DCU 101 with hard wires. And the DCU 101, through the current, the voltage and the temperature sampling signals, to detect the status of the relays K1, K2, K3, K4, K5, K6, K7, and K8, as well as the status of the charging port 204, the motor driver module 103, the water cooling unit 205, the electric defroster 206, the electric air conditioner 207, the electric warm-air blower 208, the oil pump DC/AC 209, and the air pump DC/AC 210, and then internal calculations and logical judgment are performed in the DCU 101 to control the relays K1, K2, K3, K4, K5, K6, K7, and K8 to connect or disconnect the power supply circuits of the charging port 204, the motor driver module 103, the water cooling unit 205, the electric defroster 206, the electric air conditioner 207, the electric warm-air blower 208, the oil pump DC/AC 209, and the air pump DC/AC 210, and to regulate the current supplied to the above electrical device.

In this embodiment, the DCU 101 integrates the functions of the four controllers including the VCU, the BMS, the MCU and the PDU in the prior art. The DCU 101 acquires information of a plurality of electrical device, the power battery 102 and a plurality of switches, detects the status of a plurality of electrical device, the power battery 102 and switches, and then performs internal calculations and logical judgment to determine the control strategy, so not like the prior art, in which the VCU, the BMS, the PDU and the MCU work independently and perform complex communication between each other. Therefore, the electric vehicle control system 100 with simple structure in this embodiment is capable of reducing the risk of faults in a fast and efficient manner.

Figure 3:
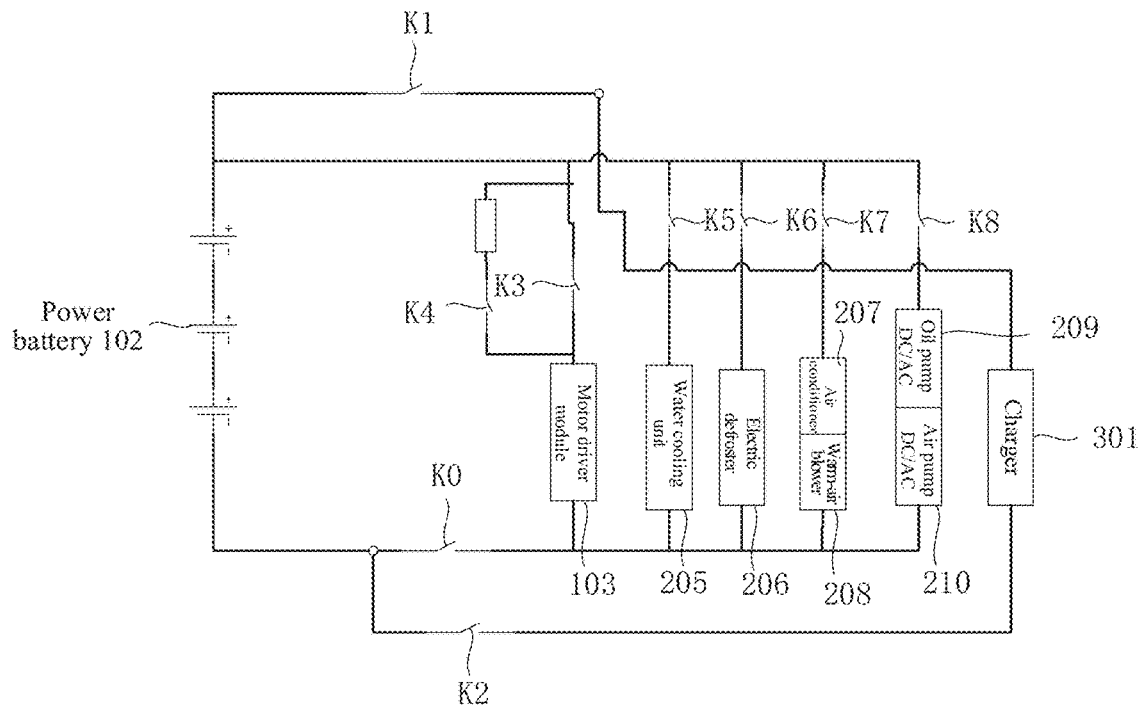
FIG. 3 is a schematic diagram of current distribution of major electrical device in the electric vehicle control system according to some embodiments of this application.

FIG. 3 is a schematic diagram of current distribution of major electrical device in the electric vehicle control system according to some embodiments of this application, showing the high-voltage current distribution of major electrical device in FIG. 2.

As shown in FIG. 3, the motor driver module 103 is electrically connected to the power battery 102 through the positive-side main relay K3, the precharging relay K4, and the general negative relay K0. The water cooling unit 205 is electrically connected to the power battery 102 through the water cooling unit relay K5 and the general negative relay K0. The electric defroster 206 is electrically connected to the power battery 102 through the electric defroster relay K6 and the general negative relay K0. The electric air conditioner 207 and the electric warm-air blower 208 are electrically connected to the power battery 102 through the relay K7 and the general negative relay K0. The oil pump DC/AC 209 and the air pump DC/AC 210 are electrically connected to the power battery 102 through the relay K8 and the general negative relay K0. An external charger 301, inserted into the charging port 204, is electrically connected to the power battery 102 through the charging positive relay K1 and the charging negative relay K2.

In this embodiment, the DCU 101 integrates the functions of the four controllers including the VCU, the BMS, the MCU and the PDU in the prior art. The DCU 101 acquires information of a plurality of electrical device, the power battery 102 and a plurality of switches, detects the status of a plurality of electrical device, the power battery 102 and switches, and then performs internal calculations and logical judgment to determine the control strategy. Therefore, the electric vehicle control system 100 with simple structure in this embodiment is capable of reducing the risk of faults in a fast and efficient manner and ensuring efficient and effective control of a plurality of electrical device.

Figure 4:
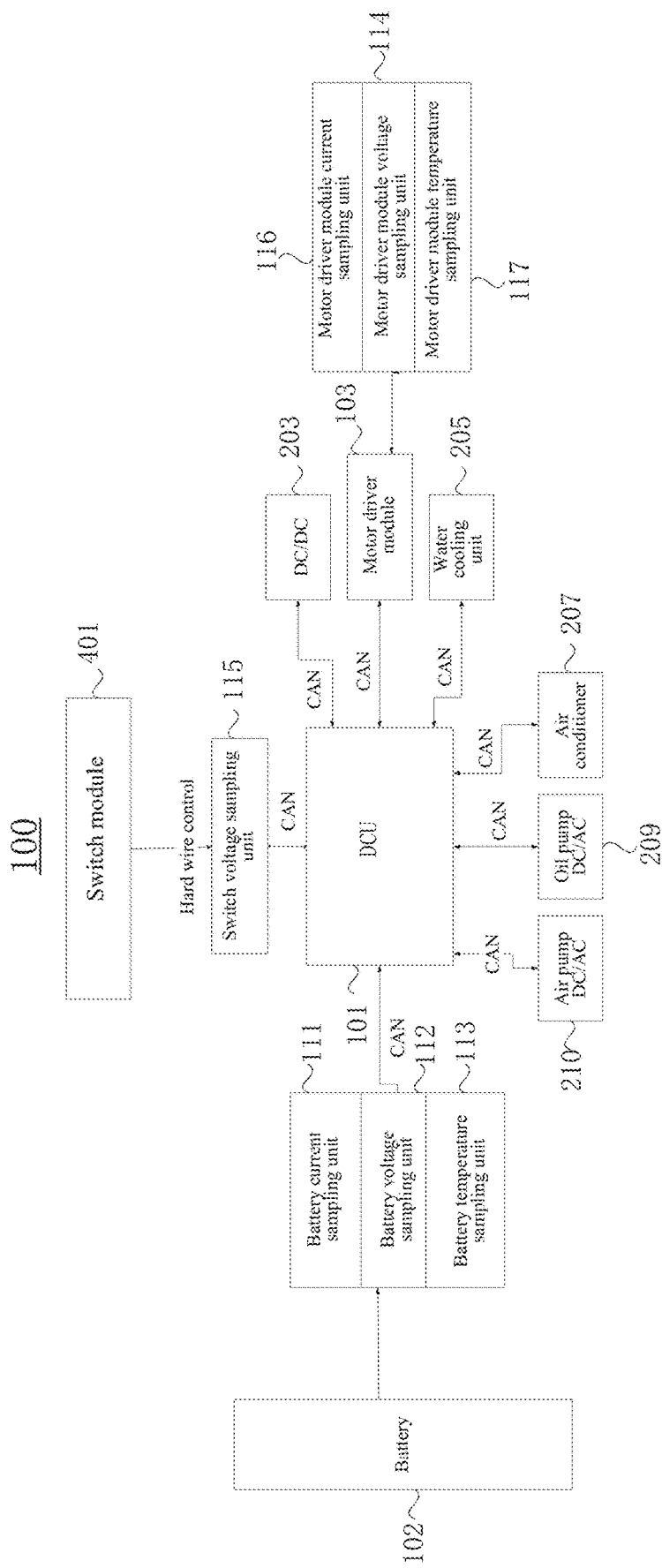
FIG. 4 is a connection diagram of the electric vehicle control system according to some embodiments of this application.

FIG. 4 is a connection diagram of the electric vehicle control system according to some embodiments of this application.

As shown in FIG. 4, in the electric vehicle control system 100 in the embodiment of this application, the DCU 101 is connected to the battery current sampling unit 111, the switch voltage sampling unit 115, the DC/DC 203, the motor driver module 103, the water cooling unit 205, the air conditioner 207, the oil pump DC/AC 209 and the air pump DC/AC 210 through signal wires, such as the communication performed through the CAN Protocol (Controller Area Network Protocol), and the DCU 101 is connected to a switch module 401 with hard wires. The switch module 401 represents any switch in FIG. 1 or FIG. 2 or FIG. 3.

As shown in FIG. 4, the battery current sampling unit 111 is connected to the power battery 102, and the motor driver module 103 is connected to the sampling units 116, 114, and 117.

A current sensor may be used to acquire current sampling signals. For example, the positive or negative pole of the power battery 102 may be connected in series to the current sensor, and current sensors may also be arranged at the input positive pole of the motor driver module 103 and the three-stage outputting three-phase electricity. The battery current sampling units 111 and 116 acquire the sampling signals of the power battery 102 and the motor driver module 103; the switch voltage sampling unit 115 acquires the voltage sampling signals of the switch module 401; and the current sampling signals acquired by such electrical device as the water cooling unit 205, air conditioner 207, the oil pump DC/AC 209 and the air pump DC/AC 210 are transmitted to the DCU 101 through CAN bus wires, and then the DCU 101 performs calculations and judgment according to these sampling signals to control the switch module 401 and the current attacked to the electrical device from the power battery 102. For example, when the total current provided by the power battery 102 is reduced, the DCU 101 may turn off the current supply of a portion of electrical device so as to achieve rational distribution.

In this embodiment, the DCU 101, with centralized control functions, is connected to the electrical device and the sampling units with signal wires, such as CAN. The DCU receives sampling signals from the electrical device and the current sampling unit, and then sends control signals to the electrical device and the current sampling unit.

As the DCU 101 and the switch module 401 are connected with hard wires, signals may be transmitted fast between the DCU 101 and the switch module 401, as a result of which the response time is shortened greatly and fast control of the switch module is realized, and also loss and delay of communication may be avoided and the fault rate may be reduced.

Figure 5:
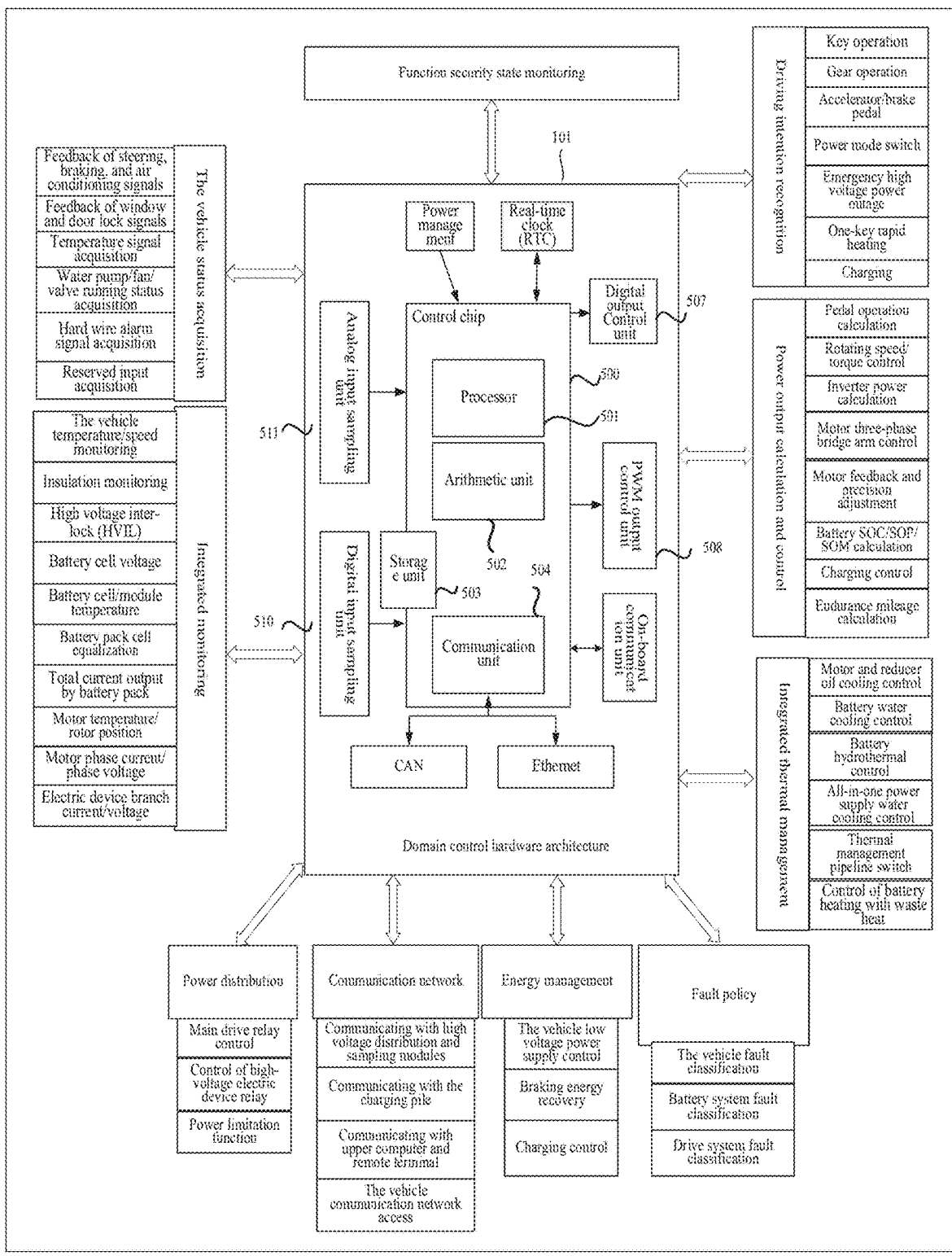
FIG. 5 is a DCU architecture diagram of the electric vehicle control system according to some embodiments of this application.

FIG. 5 is a DCU architecture diagram of the electric vehicle control system according to some embodiments of this application.

FIG. 5 lists the functions that may be realized by the electric vehicle control system 100 of this embodiment.

As shown in FIG. 5, the DCU 101 is provided with a control chip 500 which is a central control device of the DCU 101, and the control chip 500 is provided with a processor 501, an arithmetic unit 502, a storage unit 503, and a communication unit 504.

The DCU 101 also includes a digital input sampling unit 510, an analog input sampling unit 511, a digital output control unit 507, and a PWM output control unit 508. The analog input sampling unit 511 and the digital input sampling unit 510 input the sampling signals sent by the signal sampling units into the control chip 500 in the form of analog signals and digital signals respectively, and through the calculations and processing of the arithmetic unit 502 and the processor 501, the sampling signals are output by the digital output control unit 507 or the PWM output control unit 508. The storage unit 503 is intended for storing information data.

The digital sampling signals generally come from the relays, steering control, key operation, gear operation, an accelerator/brake pedal, power mode switch, and the like. The analog sampling signals generally come from temperature sampling, pedal position sampling, air pressure sampling, and the like. The PWM output control unit 508 outputs the control signals to the compressor, the water pump, the fan, and the like.

In FIG. 5, the functions of the DCU 101 are listed around the DCU 101. Taking the integrated monitoring function as an example, for example, when conducting temperature monitoring, the temperature sensor will send temperature signals to the DCU 101, and the DCU 101 will interact with the temperature sensor to transmit information.

The main drive relay control and high voltage electric device relay control in the power distribution functions relate to the power-on and power-off of the electric vehicle.

Among the functions of the DCU 101, the functions with BMS involved include: power battery SOC/SOP/SOH calculation and charging control included in the function of power output and calculation control; emergency high-voltage power outage included in the function of driving intention recognition; insulation monitoring, high voltage inter-lock, power battery cell voltage, power battery cell/module temperature, power battery pack cell equalization, power battery pack output and total current/voltage included in the function of integrated monitoring; the vehicle low-voltage power control and charging control included in the function of energy management; power battery water cooling control and power battery water thermal control included in the function of integrated thermal management; and the like.

Among the functions of the DCU 101, the functions with MCU involved include: motor temperature/rotor position and motor phase current/phase voltage included in the function of integrated monitoring; rotating speed/torque control, inverter power calculation, motor three-phase bridge arm control, motor feedback and precision adjustment included in the function of power output calculation and control; and the like.

Among the functions of the DCU 101, the functions with VCU involved include: the vehicle state acquisition function; pedal operation calculation included in the function of power output calculation and control; energy management function; key operation, gear operation, accelerator/brake pedal, power mode switch, and power output calculation included in the function of driving intention recognition; and endurance mileage calculation included in the control function; and the like.

In this embodiment, the DCU 101 integrates the functions of the VCU, the BMS, the PDU, and the MCU, thus the problems that a plurality of controllers, with independent management and control, perform complex communication and control strategy mutually may be avoided. Therefore, the electric vehicle control system 100 with simple structure in this embodiment is capable of simplifying the wiring, the control strategy and the communication manner, and reducing the risk of faults in a fast and efficient manner.

In this embodiment, the DCU 101 acquires sampling signals, and the internal arithmetic unit 502 performs calculations and the processor 501 performs logical judgment to determine the control strategy. Therefore, the control system 100 of the electric vehicle in this embodiment, with centralized control capacity and fast response, is capable of conducting energy management and power distribution of the vehicle better.

Figure 6:
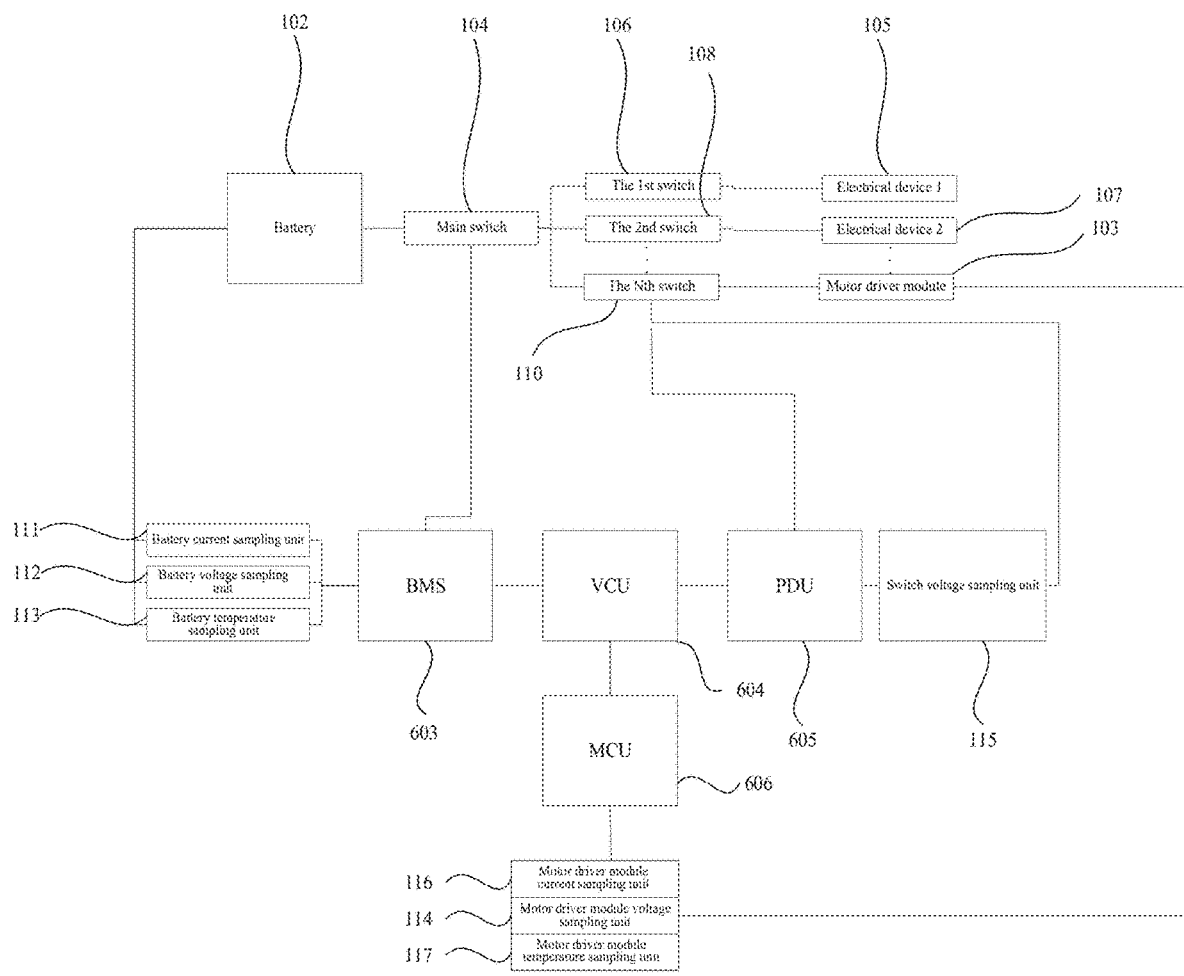
FIG. 6 is a structural schematic diagram of a vehicle control system in the prior art.

For comparison, FIG. 6 is a structural schematic diagram of a vehicle control system in the prior art.

As shown in FIG. 6, the vehicle control system 600 in the prior art is provided with a BMS 603, a VCU 604, a PDU 605, and an MCU 606. The BMS 603 is connected to the VCU 604, and the VCU 604 is connected to the PDU 60S and the MCU 606.

The BMS 603 is connected to the battery current sampling unit 111, the battery voltage sampling unit 112 and the battery temperature sampling unit 113, as well as the main switch 104. The battery current sampling unit 111, the battery voltage sampling unit 112 and the battery temperature sampling unit 113 acquire the current, voltage and temperature information of the power battery 102 and send the sampling signals to the BMS 603. The BMS 603 transmits the current, voltage and temperature information of the power battery 102 to the VCU 604, and the VCU 604 performs calculations and judgment, and according to the judgment results, the PDU 605 is instructed to control the on/off of the $1^{st}$ switch 106, the 2nd switch 108 and the $N^{th}$ switch 110, and the BMS 603 is instructed to control the current supplied by the power battery 102 to each electrical device.

The PDU 605 is connected to the $1^{st}$ switch 106, the 2nd switch 108, and the 3rd switch 110 through the switch voltage sampling unit 115. The switch voltage sampling unit 115 acquires the voltage signals of the $1^{st}$ switch 106, the 2nd switch 108, and the $N^{th}$ switch 110 and sends the sampling signals to the PDU 605. The PDU 605 sends the sampling signals of the $1^{st}$ switch 106, the 2nd switch 108, and the $N^{th}$ switch 110 to the VCU 604. And then the VCU 604 performs calculations and judgment, and according to the judgment results, the $1^{st}$ switch 106, the 2nd switch 108, and the $N^{th}$ switch 110 are controlled directly or through the PDU 605.

The MCU 606 is connected to the motor driver module 103 through the current sampling unit 116, the voltage sampling unit 114 and the temperature sampling unit 117. The current sampling unit 116, the voltage sampling unit 114 and the temperature sampling unit 117 acquires the current, voltage and temperature information of the motor driver module 103, and sends the sampling signals to the MCU 606. And the MCU 606 transmits the current, voltage and temperature information of the motor driver module 103 to the VCU 604. The VCU 604 performs calculations and judgment, and according to the judgment results, the motor driver module 103 is instructed to control the motor, for example, the electrodes are instructed to output such drive signals as torque and rotating speed.

As mentioned above, in the prior art, the VCU, the BMS, the PDU and the MCU conduct independent management and control and perform complex communication and control strategy mutually, resulting in slow response and high fault rate.

Figure 7:
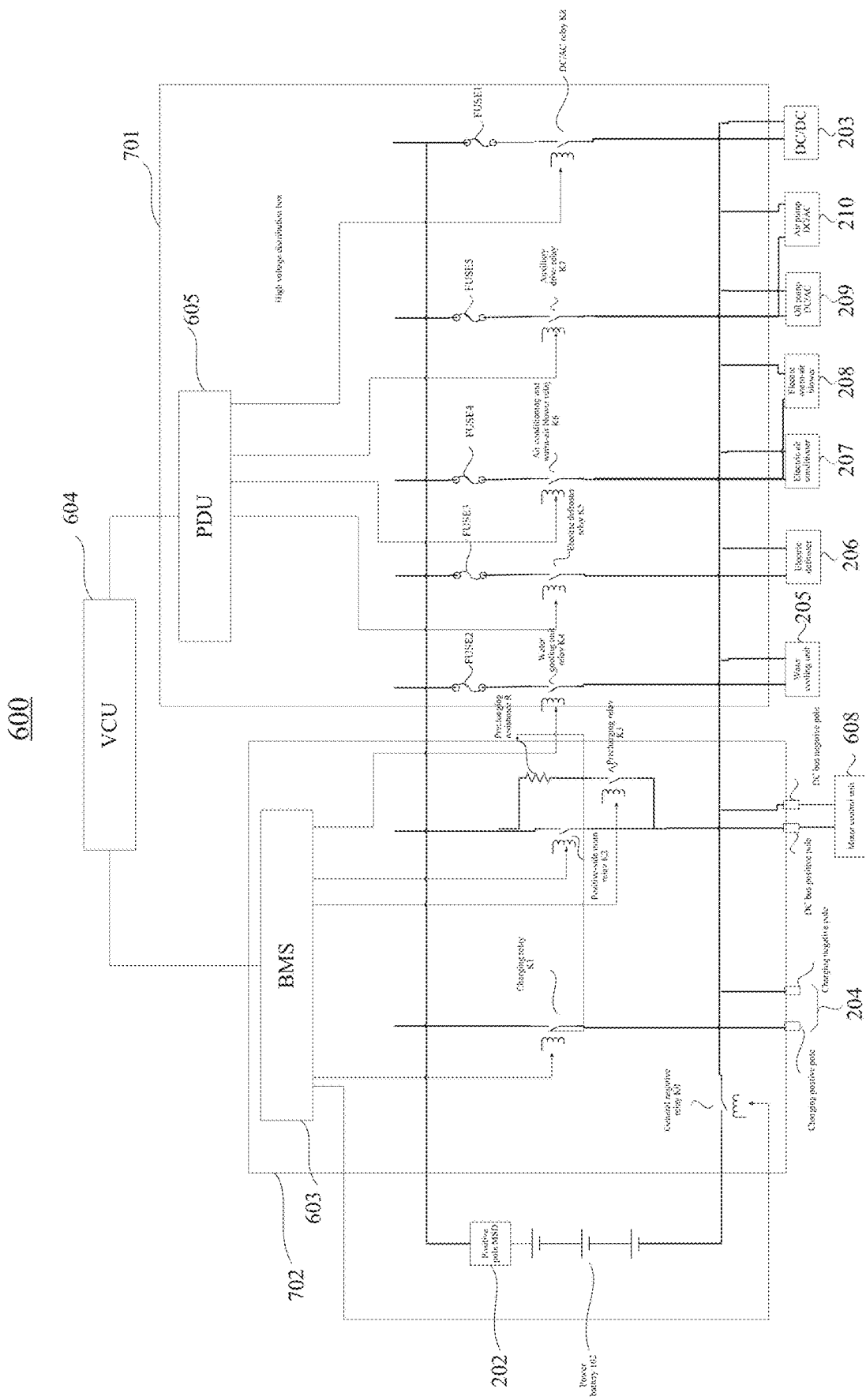
FIG. 7 is a schematic diagram of high-voltage power distribution of a vehicle control system in the prior art.

For comparison, FIG. 7 is a schematic diagram of high-voltage power distribution of a vehicle control system in the prior art.

The vehicle control system 600 shown in FIG. 7 is provided with the BMS 603, the VCU 604, the PDU 605 and an electrode controller 608. The PDU 605, and the electric defroster relay K5, the air conditioner and the warm-air blower relay K7, the auxiliary drive relay K7 of the oil pump DC/AC 209 and the air pump DC/AC 210, DC/DC relay K8, and the like are arranged in the high-voltage distribution box 701. The PDU 605, by controlling the electric defroster relay K5, the air conditioner and warm-air blower relay K7, the auxiliary drive relay K7 of the oil pump DC/AC 209 and the air pump DC/AC 210, and DC/DC relay K8, performs high-voltage control of such electric components as the water cooling unit 205, the electric defroster 206, the electric air conditioner 207, the electric warm-air blower 208, the oil pump DC/AC 209, the air pump DC/AC 210, and the DC/DC 203.

The BMS 603, and the general negative relay K0 connected with the negative pole of the power battery 102, the positive charging relay K1 connected with the positive pole of the charging port 204, the positive-side main relay K2 connected with the positive pole of the motor control unit 608, the precharging relay K3, the water cooling unit relay K4, and the like are arranged in the BMS distribution box 702. The BMS 603 mainly performs high-voltage control of the motor driver module 606 (inverter) of the motor control unit 608.

In the prior art, the VCU 604 and the BMS 603 are equipped with a high voltage distribution box respectively, with complex electrical topology and various wires. The VCU 604 and the BMS 603 interact with each other through CAN information and perform logical judgment mutually and then the relay is closed, as a result of which the power-on and power-off operation takes a long time. The information interactive communication between the VCU 604 and the BMS 603, on a software execution level, requires communication protocols, so there may be risks and situations of loss and delay of communication, thus affecting the information interaction between the two. As a result, the power-on (high voltage startup) operation fails and the vehicle fails to start normally, which affects user experience.

In the electric vehicle control method described in the embodiment of this application, the electric vehicle is provided with the DCU 101, and the control method includes that the DCU 101 receives the sampling signals of the power battery 102 and the electrical device 105 and 107 and manages and controls the power battery 102 and the electrical device 105 and 107 according to the sampling signals.

That is, the DCU 101 integrates the functions of the BMS, the MCU and the VCU in the prior art, thus the control strategy and the communication manner are simplified, the time of receiving and sending data is saved, the capability of processing comprehensive data is improved, power-on and power-off time is reduced, and the fault rate is reduced.

In some possible embodiments, the DCU 101 receives the sampling signals from the switch module 401 and controls the on/off operation of the switch module 401 according to the sampling signals.

The DCU 101 further integrates the functions of the PDU, thus the electric vehicle control method in this embodiment further simplifies the control strategy and the communication manner.

In some possible embodiments, the DCU 101 detects the state of the electrical device 105, 107, and 103 and performs calculations of the test data to determine the control strategy for these electrical devices.

That is, the DCU 101 performs internal calculations and logical judgment, and the calculation results may be shared. Thus, the procedures that each controller processes and then transmits data individually in the prior art are eliminated, and the comprehensive processing capacity is greatly improved, and it is not needed to formulate complex communication protocol and control strategy.

In some possible embodiments, the DCU 101 is connected to the electrical device and the current sampling unit with signal wires, and to the switch module 401 with hard wires.

The DCU 101 is connected to switch module 401 with hard wires, thus signals may be transmitted fast and fast control of the switch module may be achieved.

In some possible embodiments, the electric devices include the oil pump DC/AC 209, the air pump DC/AC 210, the electric air conditioner 207, the electric warm-air blower 208, the electric defroster 206, the water cooling unit 205, the DC/DC 203, and the like.

That is, the DCU 101 controls the above electrical device and optimizes the high-voltage power distribution and control of the vehicle.

The electric vehicle control system and the control method in the above embodiment of the application are capable of optimizing the power-on process, the power-off process, and the charging process of the electric vehicle. A detailed description is given below.

Figure 8:
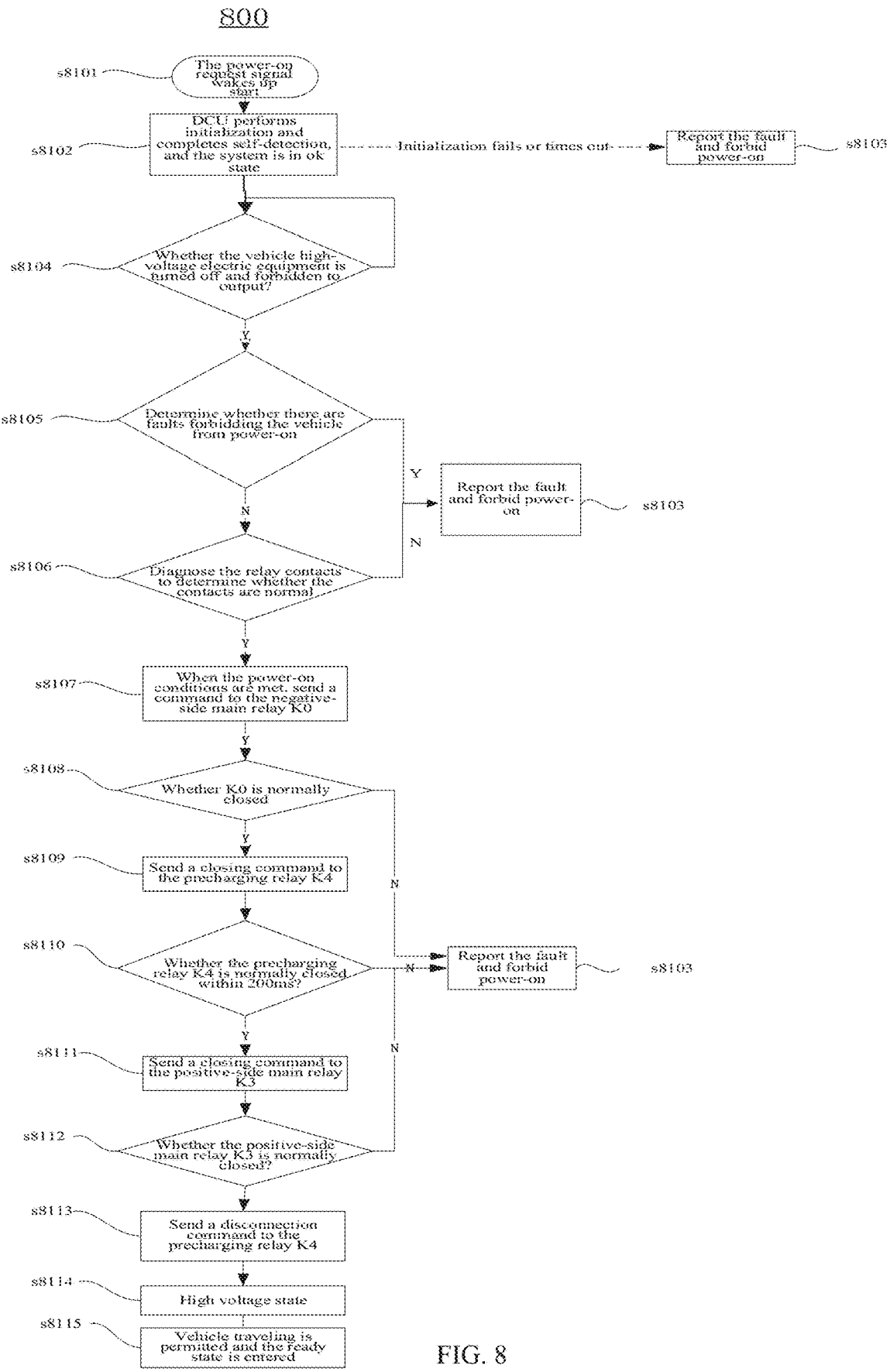
FIG. 8 is a flow diagram of the power-on method of the electric vehicle according to some embodiments of this application.

FIG. 8 is a flow diagram of the power-on method of the electric vehicle according to some embodiments of this application.

In an electric vehicle power-on method 800 in the embodiments of this application, the electric vehicle is provided with the DCU 101. The DCU 101 receives sampling signals of the power battery 102, the switch module 401 and electrical device 103, 105, and 107 and manages and controls the power battery 102, the switch module 401, and electrical device 103, 105, and 107 according to the sampling signals.

As shown in FIG. 8, the power-on method 800 in this embodiment includes the following steps:

s8101, detecting, by the DCU 101, a high voltage startup request signal to start the power-on process;

s8102, initializing by the DCU 101, to complete self-detection proceeding to S8103 if the initialization fails or times out; or proceeding to s8104;

s8103, reporting faults and disabling power-on;

s8104, detecting, by the DCU 101 whether the high-voltage electrical device is turned off and is disable to output, if not, repeating s8104; if yes, proceeding to s8105;

s8105, determining, by the DCU 101, whether there are faults to disable power-on, if yes, proceeding to s8103; if not, proceeding to s8106;

s8106, diagnosing, by the DCU 101, the relay contacts through voltage sampling to determine whether the contacts are normal or not, if not, proceeding to s8103; if yes, proceeding to s8107;

s8107, sending, by the DCU 101, a closing command to the negative-side main relay K0 when the power-on conditions are met to connect to the major loop;

s8108, detecting, by the DCU 101, whether the negative-side main relay K0 is normally closed, if not, proceeding to s8103; if yes, proceeding to s8109;

s8109, sending, by the DCU 101, the closing command to the precharging relay K4 to connect to the precharging loop, and then precharging the motor driver module 103;

s8110, detecting, by the DCU 101, whether the precharging relay K4 is normally closed within a certain period of time (such as 200 ms), if not, proceeding to s8103; if yes, proceeding to s8111;

s8111, sending, by the DCU 101, a closing command to the positive-side main relay K3 to connect to the motor drive loop;

s8112, detecting, by the DCU 101 detects, whether the positive-side main relay K3 is normally closed, if not, proceeding to s8103; if yes, proceeding to s8113;

s8113, sending, by the DCU 101, a disconnection command to the precharging relay K4 to turn off the precharging loop, and ending the precharging; and s8114, the vehicle proceeding to the high voltage state, and the major loop being power on successfully.

The vehicle's proceeding to a high voltage state mainly refers to the motor 109's proceeding to a high voltage state; the DCU 101 sends instructions to close the water cooling unit relay K5, the electric defroster relay K6, the air conditioning warm-air blower relay K7, and the auxiliary drive relay K8; that is, all relays are closed, and the water cooling unit loop, the electric defroster loop, the air conditioning warm-air blower loop, and the auxiliary drive loop are turned on, and high voltage power-on operation of the vehicle is completed.

s8115, permitting vehicle traveling and entering a ready state.

In s8106, after the relay contact diagnosis is completed, the DCU 101 internally reads the information of the electrical device 105 and 107, for example, the information includes the electrical device to be turned on, and the rated power of each electrical device; and according to the rated power and weight value of different electrical device, calculations are performed with reference to the State of Charge (SOC), and then according to the calculation results whether it is needed to conduct power distribution control processing on some electrical device is determined, thus the high voltage distribution is completed.

In s8107, the power-on conditions include:
a. The BMS 603 is not in the state of program update;
b. No high voltage inter-lock fault;
c. No ACAN communication lost;
d. No BMS 603 power supply fault;
e. All synopsis data of system cell voltage collected;
f. All synopsis data of CSC temperature collected;
g. Pack current is effective;
h. No disconnection fault of system cell voltage sampling lines;
i. No system cell over voltage fault;
j. No minor fault of module temperature sensor;
k. No major fault of module temperature sensor;
l. No fault of loss of SCAN communication;
m. No internal communication fault;
n. No current sensor fault;
o. No insulation alarm fault;
p. No disconnection fault of inner high voltage loop;
q. The positive-side main relay and the master precharging relay are in the state of disconnection.

According to the power-on method in the above embodiment, the DCU 101 integrates the functions of the BMS, the VCU, the PDU and the MCU. The DCU 101 directly controls relays, thus the control capability is centralized and the response is fast, and the situation in the prior art that the VCU 604, the BMS 603 and the PDU 605 work independently and perform complex communication and control strategy between each other in the power-on process is simplified. In this embodiment, the DCU 101 detects and calculates the power-on conditions and makes logical judgment, and the calculation results are shared, thus the link in the prior art that each controller transmits data to each other and the VCU 604 makes judgment is eliminated. Therefore, the power-on method in this embodiment, with simple communication manner and fast response, is capable of shortening the power-on time and reducing the fault rate.

Figure 9:
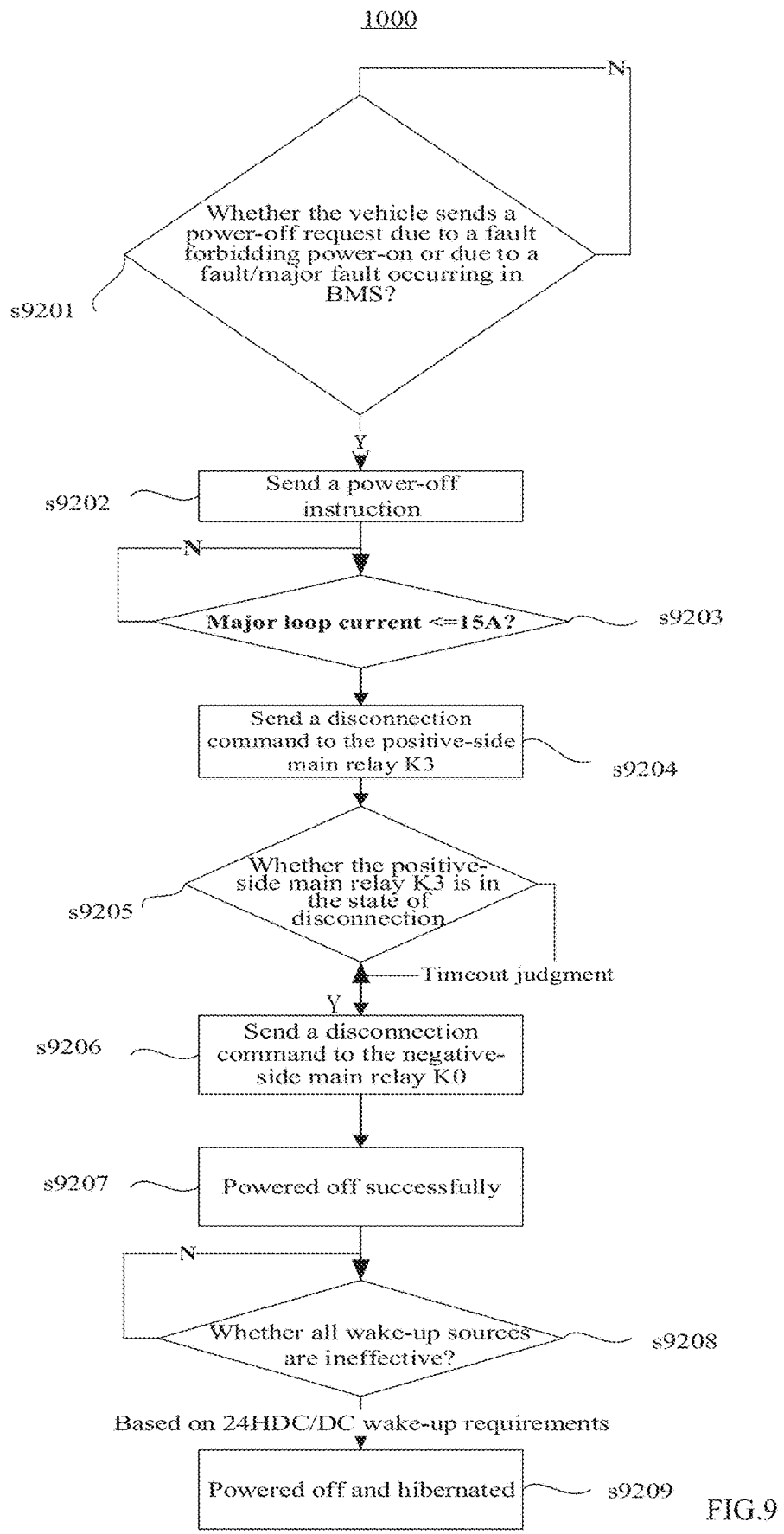
FIG. 9 is a flow diagram of the power-off method of the electric vehicle according to some embodiments of this application.

FIG. 9 is a flow diagram of the power-off method of the electric vehicle according to some embodiments of this application.

In an electric vehicle power-off method 1000 in some embodiments of this application, the electric vehicle is provided with the DCU 101 as mentioned above. And the DCU 101 receives sampling signals from the power battery 102, the switch module 401, and electrical device 103, 105, and 107, and according to the sampling signals, manages and controls the power battery 102, the switch module 401, and electrical device 103, 105, and 107.

There are two power-off manners: passive power-off and active power-off. The DCU 101 sends a power-off instruction for power-ff operation due to a fault or in other emergencies, which is passive power-off; and the DCU 101 accepts an instruction and actively sends a power-off request for power-off operation, which is active power-off. FIG. 9 shows a flow diagram of a passive power-off method according to some embodiments of this application.

As shown in FIG. 9, the power-off method 1000 in this embodiment includes the following steps:

S9201, determining, by the DCU 101, whether the vehicle sends a power-off request due to a fault forbidding power-on or a fault occurring in DCU 101 itself, if not, repeating s10201; if yes, proceeding to s9202.

S9202, sending, by the DCU 101, the power-off instruction to start the power-off process.

S9203, detecting, by the DCU 101, whether the current of the major loop is less than the set threshold value, for example, setting the threshold value as 15A, if not, repeating s9203; if yes, proceeding to s9204.

The set threshold value of the major loop current is generally not greater than 15 A. When the DCU 101 detects whether the major loop current is less than the set threshold value, if the major loop current is less than the set threshold value, the power-off operation may be performed. Power-off with load should be avoided, otherwise the performance of the vehicle devices may be affected.

S9204, sending, by the DCU 101, a disconnection command to the positive-side main relay K3 to turn off the motor drive loop;

S9205, detecting, by the DCU 101, whether the positive-side main relay K3 is in the state of disconnection, if not, proceeding to "timeout judgment"; if yes, proceeding to s10206;

S9206, sending by the DCU 101, a disconnection command to the negative-side main relay K0 to turn off the major loop;

S9207, the high voltage being powered off successfully;

S9208, detecting whether all wake-up sources are ineffective, if not, repeating s9208; if yes, proceeding to s9209 based on 24H DC/DC wake-up requirements;

According to the 24 h monitoring requirements, after the key wake-up signal is ineffective and the high voltage power-off is completed, the vehicle power-off monitoring state is entered, and the continuous monitoring lasts for 5 min. When extreme faults such as over-temperature or over voltage occur, the monitoring continues until the SOC is too low, such as class 2, or monomer under voltage class 1, or other status, and then the mode switch is performed.

S9209, power off and resting.

According to the power-off method in the above embodiment of this application, the DCU 101 directly controls relays, thus the control capability is centralized and the response is fast, and the links in the prior art that the VCU 604, the BMS 603, and the PDU 605 work independently and perform complex communication and control strategy mutually are simplified. Therefore, the power-off method in this embodiment, with simple communication manner and control strategy, is capable of shortening the power-off time and reducing the fault rate.

Figure 10:
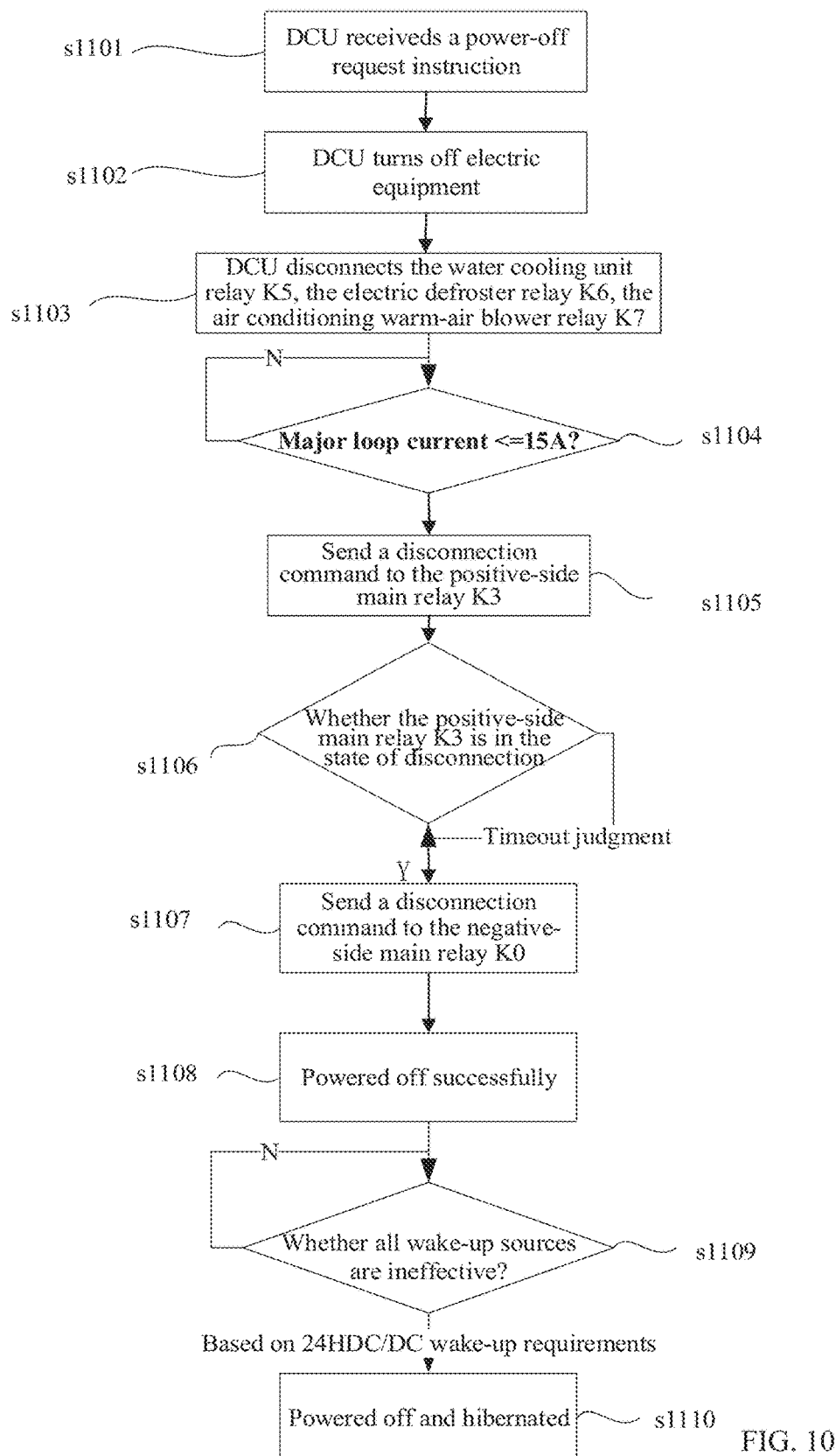
FIG. 10 is a flow diagram of the power-off method of the electric vehicle according to other embodiments of this application.

FIG. 10 is a flow diagram of the power-off method of the electric vehicle according to other embodiments of this application.

FIG. 10 shows a flow chart of the active power-off method in some embodiments of this application.

As shown in FIG. 10, the power-off method 1100 in this embodiment includes the following steps:

S1101, accepting, by the DCU 101 the power-off instruction and sending a power-off request to start the power-off process;

S1102, turning off, by the DCU 101, the electrical device 105 and 107;

S1103, disconnecting, by the DCU 101, a relay K5 of the water cooling unit, a relay K6 the electric defroster, the relay K7 of the air conditioning warm-air blower, and then turning off the water cooling unit loop, the electric defroster loop, and the air conditioning warm-air blower loop;

S1104, acquiring, by the DCU 101, the major loop current, detecting whether the major loop current is less than the threshold value, and acquiring the bus current of the motor, and then lowering the current to the threshold value in the shortest time.

For example, if the threshold value is set as 15 A and the major loop current is greater than the threshold value, repeat s1104; if less than the threshold value, proceed to s1105. The threshold value of the major loop current is generally set not greater than 15 A.

S1105, sending, by the DCU 101, a disconnection command to the positive-side main relay K3 to turn off the motor drive loop;

s1106, detecting, by the DCU 101, whether the positive-side main relay K3 is in the state of disconnection, if not, proceeding to "timeout judgment"; if yes, proceeding to s1107;

s1107, sending, by the DCU 101, a disconnection command to the negative-side main relay K0 to turn off the major loop;

s1108, the high voltage being powered off successfully;

s1109, detecting whether all wake-up sources are ineffective, if not, repeating s1109; if yes, proceeding to s1110 based on 24H DC/DC wake-up requirements; and S1110, powering off and resting.

According to the power-off method in the above embodiment of this application, the DCU 101 directly controls relays, thus the control capability is centralized and the response is fast, and the links in the prior art that the VCU, the BMS, and the PDU work independently and perform complex communication and control strategy mutually are simplified. Therefore, the power-off method in this embodiment, with simple communication manner and control strategy, is capable of shortening the power-off time and reducing the fault rate.

Figure 11A:
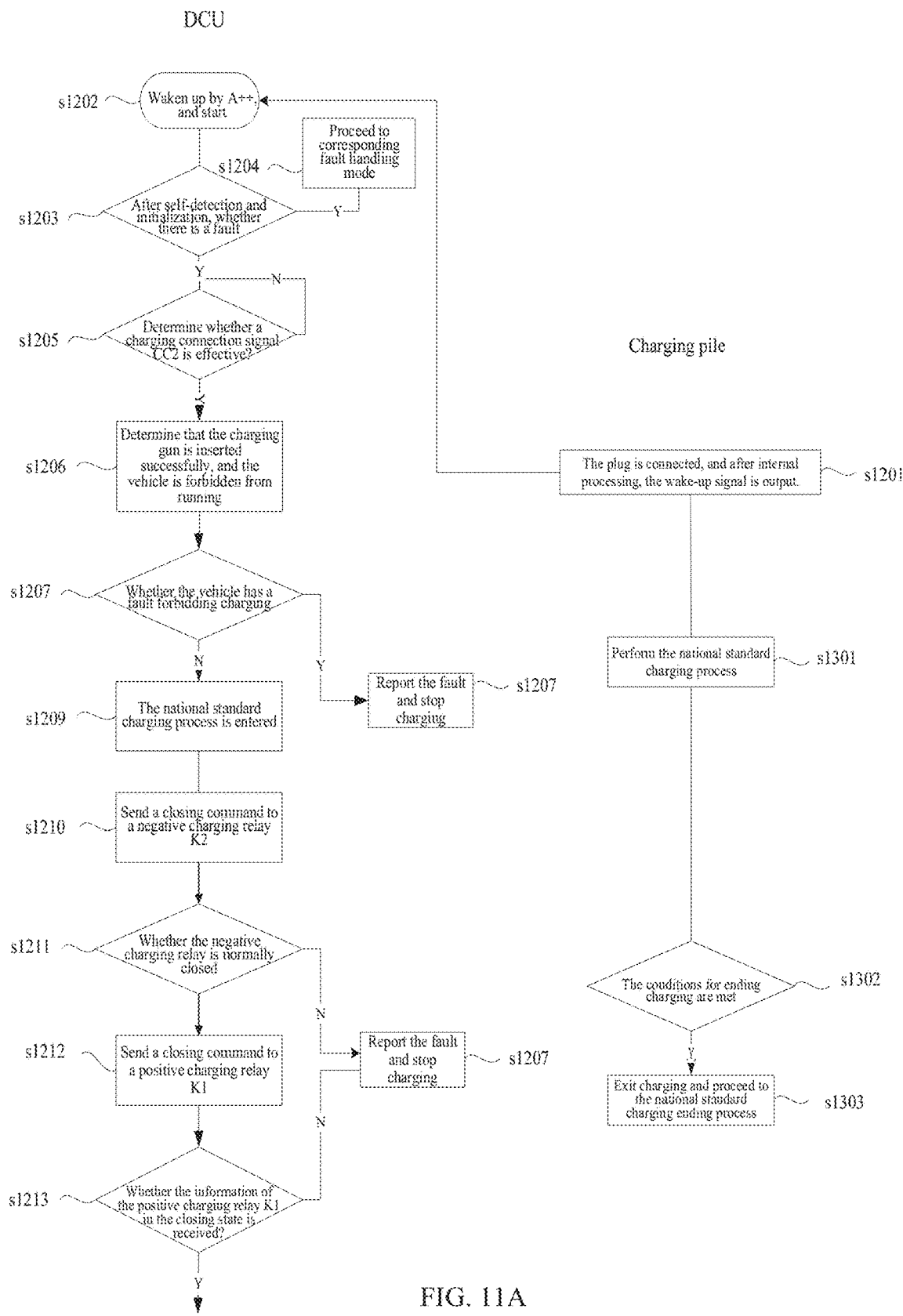
FIG. 11 (FIG. 11A followed by FIG. 11B) is a flow diagram of the charging method of the electric vehicle according to some embodiments of this application.
Figure 11B:
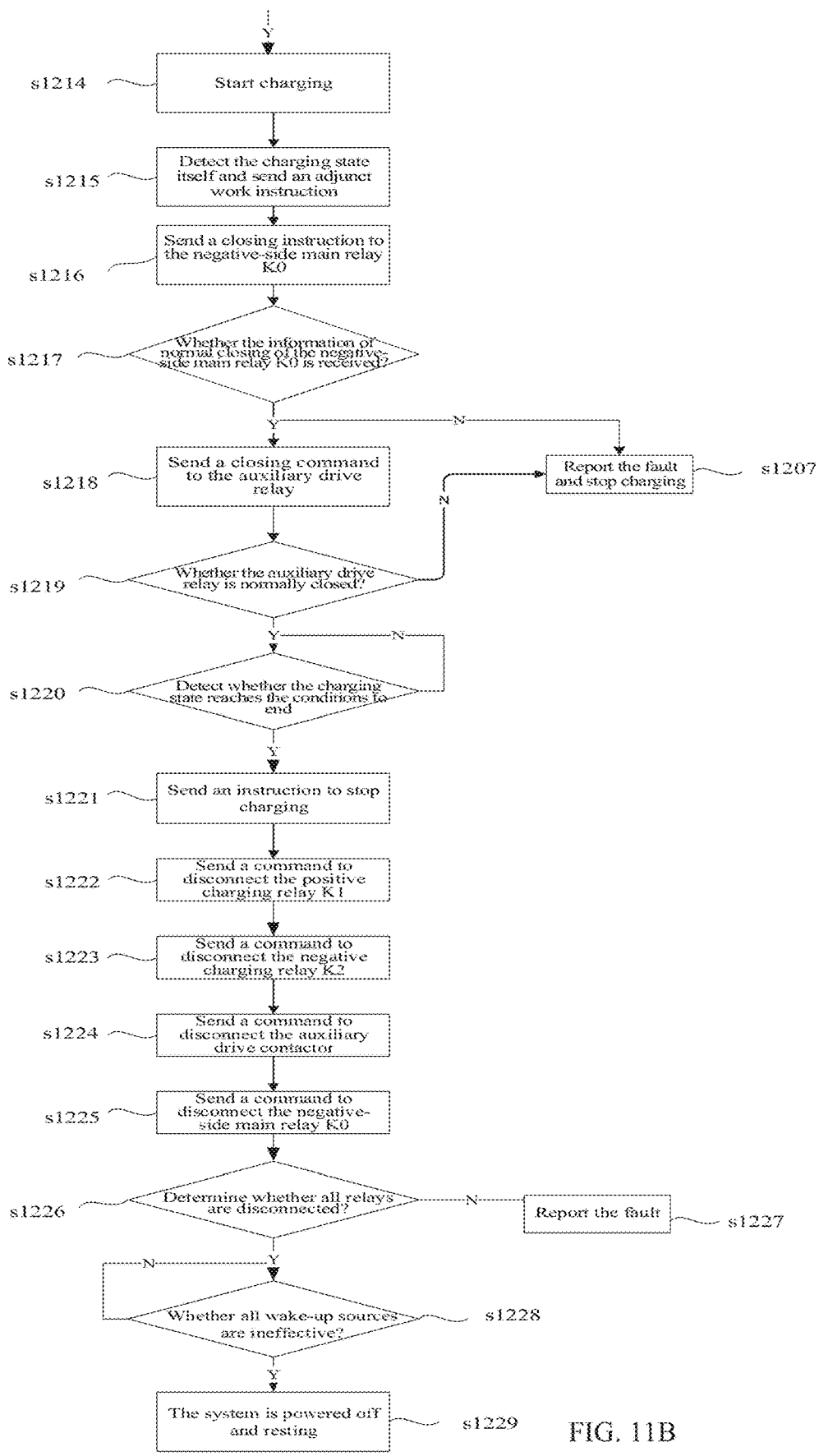

FIG. 11 (FIG. 11A followed by FIG. 11B) is a flow diagram of the charging method of the electric vehicle according to some embodiments of this application.

A charging device described in the embodiments of this application may be an ordinary charging pile, a super charging pile, a charging pile supporting the mode of vehicle to grid (V2G), or a charging and discharging device capable of charging and discharging a power battery, and the like. The specific types and application scenarios of the charging devices are not limited in the embodiments of this application.

In an electric vehicle charging method 1200 in the embodiments of this application, the electric vehicle is provided with the DCU 101 as mentioned above. The DCU 101 receives the sampling signals from the power battery 102, the switch module 401, and electrical device 103, 105, and 107, and manages and controls the power battery 102, the switch module 401, and electrical device 103, 105, and 107 according to the sampling signals.

As shown in FIG. 11, the charging method 1200 includes the following steps:

s1201, connecting a plug of a charging gun 301 on a charging pile to and inserting into a charging port 204, after internal processing of the charging pile, the charging pile outputting a wake-up signal to the DCU 101, and then proceeding to s1202 or s1301;

s1202, receiving, by the DCU 101, a wake-up signal A++;

s1203, performing, by the DCU 101, a self-detection and initialization and then determining whether there is a fault, if yes, proceeding to s1205; if not, proceeding to s1204;

s1204, proceeding to corresponding fault handling mode;

s1205, determining, by the DCU 101, whether a charging connection signal CC2 is effective, if not, repeating s1205; if yes, proceeding to s1206;

s1206, determining, by the DCU 101, that the charging gun is inserted successfully, and the vehicle being disable to run;

s1207, determining whether the vehicle has a fault forbidding charging, if yes, proceeding to s1208; if not, proceeding to s1209;

s1208 reporting the faults and stopping charging;

s1209, entering the national standard charging process;

s1210, sending, by the DCU 101, a closing command to a negative charging relay K2 to communicate with the charging loop;

s1211, determining whether the negative charging relay K2 is normally closed, if not, proceeding to s1207: if yes, proceeding to s1212;

s1212, sending, by the DCU 101, a closing command to a positive charging relay K1 to communicate with the charging loop;

s1213, detecting, by the DCU 101, whether the information of the positive charging relay K1 in the closing state is received or not, if not, proceeding to s1207; if yes, proceeding to s1214.

s1214, the charging pile beginning to charge;

s1215, detecting, by the DCU 101, the charging state itself and sends an adjunct work instruction. The adjunct work instruction refers to turning on the vehicle thermal management and its elements during charging, for example, turning on the water cooling unit switch, starting the water cooling;

s1216, sending, by the DCU 101, a closing command to the negative-side main relay K0 to communicate with the major loop;

s1217, detecting, by the DCU 101, whether the information of normal closing of the negative-side main relay K0 is received, if not, proceeding to s1207; if yes, proceeding to s1218.

s1218, sending, by the DCU 101, a closing command to the auxiliary drive relay KR to communicate with the auxiliary drive loop;

s1219, determining whether the auxiliary drive relay K8 is normally closed, if not, proceeding to s1207; if yes, proceeding to s1220. The DCU 101 sends a closing command to the watering cooling unit relay K5, and sends a closing command to the auxiliary drive relay K8 to communicate with the water cooling unit loop and the auxiliary drive loop; and s1220, detecting, by the DCU 101, whether the charging state reaches the conditions to end, if not, repeating s1220; if yes, proceeding to s1221.

Conditions for ending charging are as follows:
(1) Full, or charge finish as set by SOC;
(2) Charge stop, a fault forbidding charging;
(3) Charge finish, stopping charging normally by pulling out the charging gun manually.

s1221, the DCU 101 sends an instruction to stop charging.

For example, the DCU 101 detects whether the charging state reaches the conditions to end (SOC reaches 100 or the set value), and if yes, send an instruction to end charging.

CC1 is a function that an off-vehicle charger keeps monitoring the connection status between the charging plug and the charging socket by checking an input voltage signal of a contact of connection in a charging process, and, once the connection status is abnormal, turns off the output of the direct current power supply immediately and turns off the switch after completion of unloading.

CC2 is a function that the off-vehicle charger also turns off the output of the direct current power supply accordingly if no battery charging level (BCL) request message 2113 sent by the battery management system BMS 603 periodically is received by the off-vehicle charger within 100 ms in the charging process.

s1222, sending, by the DCU 101, a command to disconnect the positive charging relay K1 to turn off the charging loop;

s1223, sending, by the DCU 101, a command to disconnect the negative charging relay K2 to turn off the charging loop;

s1224, sending, by the DCU 101, a command to disconnect the auxiliary drive relay K8 to turn off the auxiliary drive loop;

s1225, sending, by the DCU 101, a command to disconnect the negative-side main relay K0 to turn off the major loop;

s1226, determining, by the DCU 101, whether all relays are disconnected, if not, proceeding to s1227; if yes, proceeding to 1228;

s1227, reporting, by the DCU 101, the fault;

s1228, determining, by the DCU 101, whether all wake-up sources are ineffective, if not, repeating s1228; if yes, proceeding to s1229;

s1229, the system being powered off and resting;

s1301, performing, by the charging pile, the national standard charging process;

s1302, meeting the conditions for ending charging;

s1303, exiting charging and proceeding to the national standard charging ending process.

In the charging method in the above embodiment of this application, the DCU 101 directly controls relays with centralized control capability and fast response and simplifies the situation in the prior art that the VCU 604, the BMS 603, and the PDU 605 work independently and carry out complex communication and control strategy between each other. Therefore, the charging method in this embodiment, with simple communication manner and control policy, is capable of reducing faults.

In the computer readable storage medium in the embodiments of this application, there are stored computer executable instructions. When the processor processes the computer executable instructions, any method in the above embodiments will be performed.

An electronic device described in the embodiments of this application includes: a memory and a processor. The memory is intended for storing computer instructions, and the processor is intended for running computer instructions and performing any method in the above embodiments.

The above embodiments are only intended for describing the technical solutions of this application, but not limiting the solutions; notwithstanding detailed descriptions of this application with reference to the foregoing embodiments have been given, those of ordinary skill in the art shall understand that: the technical solutions recorded in the foregoing embodiments may also be modified, or equivalent substitutions for some or all of the technical features thereof may be made; and such modifications or substitutions does not separate the essence of the corresponding technical solution from the scope of the technical solution in each embodiment of this application, and shall all be covered by the claims and description of this application. Particularly, to the extent that no structural conflict exists, various technical features mentioned in various embodiments may be combined in any manner. This application is not limited to the specific embodiments disclosed herein, but includes all technical solutions falling within the scope of the claims.

What is claimed is:
1. An electric vehicle control system, comprising:
a domain controller to control an electric vehicle;

a current sampler to sample current of a power battery and a motor driver of the electric vehicle, and sending sampling signals to the domain controller;

an electrical structure, driven by its power battery, to sample current flowing through the electrical structure and send sampling signals to the domain controller; and a switcher to turn on or off power supply circuits of the electrical structure and the motor driver, wherein the domain controller manages the power battery and controls the motor driver and the electrical structure according to the sampling signals sent by the electrical structure and the current sampler, the domain controller is connected to the electrical structure and the current sampler with signal wires, the domain controller is connected to the switcher with hard wires, and the domain controller is configured to:

issue a power-off instruction;

detect whether current of a major loop connected to a negative pole of the power battery is less than a preset value;

send a disconnection instruction to a motor drive loop relay connected to a positive pole of the motor driver to disconnect the motor drive loop; and send the disconnection instruction to the major loop relay connected to the negative pole of the power battery to disconnect the major loop.

2. The electric vehicle control system according to claim 1, further comprising:

a voltage sampler to sample voltage of the switcher and send the sampling signals to the domain controller, wherein the domain controller performs on/off control of the switcher according to the sampling signals sent by the voltage sampler.

3. The electric vehicle control system according to claim 1, wherein the domain controller detects a state of the electrical structure and calculates test data to determine a control strategy of the electrical structure.

4. The electric vehicle control system according to claim 1, wherein the electrical structure comprises an air pump controller, an oil pump controller, an air conditioner compressor, a water cooler, a voltage converter, and the motor driver.

5. An electric vehicle power-on method, the electric vehicle being provided with a domain controller for sampling signals from a power battery, a switcher and an electrical structure, and managing and controlling operations of the power battery, the switcher, and the electrical structure according to the sampling signals, comprising:

initializing, by the domain controller, after detecting a power-on request sign;

detecting, by the domain controller, whether a power-on condition is satisfied after completing the initializing;

sending, by the domain controller, a closing command to a major loop relay connected to a negative pole of the power battery when the power-on condition is satisfied, to connect to the major loop;

sending, by the domain controller, the closing command to a precharging loop relay of a motor driver to connect to the precharging loop to precharge the motor driver;

sending, by the domain controller, the closing command to a motor drive loop relay connected to a positive electrode of the motor driver, to connect to a motor drive loop;

sending, by the domain controller, a disconnect instruction to the precharging loop relay to end precharging, to complete power-on of the major loop; and sending, by the domain controller, the closing commands to a water cooler relay, an electric defroster relay, an air conditioning warm-air blower relay, and an auxiliary drive relay, to connect to each high-voltage electrical structure, to complete power-on of the vehicle.

6. The power-on method according to claim 5, wherein the domain controller detecting the power-on conditions comprises:

detecting whether the high-voltage electrical structure is turned off and is disable to output;

detecting whether there is any fault that prevents the vehicle from powering on; and diagnosing contacts of each of the relays.

7. The power-on method according to claim 6, wherein after diagnosing each of the relays, the domain controller reads information about the electrical structure stored inside the domain controller; and the domain controller performs calculations according to the read information about the electrical structure and then performs high-voltage distribution for the electrical structure according to calculation results.

8. The power-on method according to claim 7, wherein the information about the electrical structure read by the domain controller comprises information of the electrical structure to be turned on and rated power and weight of each electrical structure.

9. An electric vehicle power-off method, the electric vehicle being provided with a domain controller for receiving sampling signals from a power battery, a switcher, and an electrical structure, and managing and controlling operation of the power battery, the switcher, and the electrical structure according to the sampling signals, comprising:

issuing, by the domain controller, a power-off instruction;

detecting, by the domain controller, whether current of a major loop connected to a negative pole of the power battery is less than a preset value;

sending, by the domain controller, a disconnection instruction to a motor drive loop relay connected to a positive pole of a motor driver, to disconnect the motor drive loop; and sending, by the domain controller, the disconnection instruction to the major loop relay connected to the negative pole of the power battery, to disconnect the major loop.

* * * * *